United States Patent
Pozsgay et al.

(10) Patent No.: US 9,379,776 B2
(45) Date of Patent: Jun. 28, 2016

(54) SYSTEM AND METHOD FOR LOW DATA-RATE COMMUNICATION OVER A CARRIER CURRENT

(71) Applicant: MERSEN France SB SAS, Saint-Bonnet-de-Mure (FR)

(72) Inventors: Andras Pozsgay, Contamine sur Arve (FR); Armin Wellig, Satigny (CH)

(73) Assignee: MERSEN France SB SAS, Saint-Bonnet-de-Mure (FR)

( * ) Notice: Subject to any disclaimer, the term of this patent is extended or adjusted under 35 U.S.C. 154(b) by 0 days.

(21) Appl. No.: 14/774,251

(22) PCT Filed: Mar. 14, 2014

(86) PCT No.: PCT/EP2014/055070
§ 371 (c)(1),
(2) Date: Sep. 10, 2015

(87) PCT Pub. No.: WO2014/140251
PCT Pub. Date: Sep. 18, 2014

(65) Prior Publication Data
US 2016/0036493 A1  Feb. 4, 2016

(30) Foreign Application Priority Data
Mar. 15, 2013  (FR) ..................................... 13 52338

(51) Int. Cl.
*H04L 27/00* (2006.01)
*H04B 3/54* (2006.01)
*H04B 1/04* (2006.01)

(52) U.S. Cl.
CPC .................. *H04B 3/548* (2013.01); *H04B 1/04* (2013.01); *H04B 2203/547* (2013.01)

(58) Field of Classification Search
CPC ... H04L 1/0003; H04L 1/0071; H04L 5/0007; H04L 1/0009; H04L 27/0008; H04L 27/2647; H04L 1/20; H04N 5/4401; H04B 1/30; H04B 1/28

USPC ......................................... 375/295, 316, 219
See application file for complete search history.

(56) References Cited

U.S. PATENT DOCUMENTS

| | | | |
|---|---|---|---|
| 2010/0201493 A1 | 8/2010 | Takano | |
| 2012/0325283 A1 | 12/2012 | Robbins | |
| 2013/0089120 A1 | 4/2013 | Kasai et al. | |
| 2014/0161201 A1* | 6/2014 | Yukizane | H04B 3/548 375/257 |

OTHER PUBLICATIONS

International Search Report for PCT/EP2014/055070 dated Apr. 9, 2014.
French Search Report for FR 1352338 dated Oct. 4, 2013.

* cited by examiner

*Primary Examiner* — Zewdu Kassa
(74) *Attorney, Agent, or Firm* — B. Aaron Schulman, Esq.; Stites & Harbison, PLLC

(57) ABSTRACT

The invention relates to a system for low data-rate communication over a modulated direct carrier current, having one or more communication transmitters (6, 8), a communication receiver (10), and a wire bus (12) forming a shared transmission channel. Each communication transmitter (6, 8) is configured to form a first raw staggered transmission frame according to a second staggered transmission frame, said staggered transmission frames using a set of separate basic chip-encoding sequences. The basic encoding sequences or staggering the symbols used by all the communication transmitters (4, 6) are identical, and the times of the initial transmission of the second staggered frames produced by each transmitter (6, 8) are autonomously and freely determined by each transmitter (6, 8), without taking into account any synchronization signal external to the transmitter (6, 8).

14 Claims, 12 Drawing Sheets

SYSTEM AND METHOD FOR LOW DATA-RATE COMMUNICATION OVER A CARRIER CURRENT

The invention relates to a system for low data-rate communication over a modulated direct carrier current, designed to convey payload messages, emitted asynchronously and at an average frequency from a plurality of communication transmitters to a same communication receiver over a wire bus with direct carrier current connecting the transmitters and the receiver to each other in series, and relates to a corresponding communication method.

A system for low data-rate communication over a direct carrier current according to the invention is for example applicable to photovoltaic power networks for which there is a need to send remote panel measurements or photovoltaic modules forming a photovoltaic power assembly for a central station.

In fact, one of the features of a monitoring device integrated into a photovoltaic module is the ability to communicate regularly and reliably regarding the energy production and environmental parameters of that module, for example its temperature and voltage.

In order to simplify the installation of such a system in terms of additional cost and complexity, efforts are made to avoid an additional cable.

A first family of solutions proposes to implement a wireless communication system, i.e., to use radio waves, while a second family of solutions proposes to use the existing power cables as the propagation medium for the communication signals in order to form a communication bus with DC (direct current) carrier current.

The many solutions in the first family developed to date exhibit significantly deteriorated performance when the system is subjected to severe multipath interference caused by the metal reflectors of the structures of the photovoltaic modules, or when the central station is subjected to masking by the photovoltaic panels located nearby. Furthermore, these solutions may, depending on the underlying communication protocol used, not allow flexible adaptation of the capacity between occasions when the number of photovoltaic modules varies.

Thus, solutions are sought allowing the implementation of a communication protocol that is robust in terms of resistance to outside interference problems or congestion problems caused by heavy traffic, and not requiring unavailable additional frequency resources.

The many solutions of the second family, based on communication by direct carrier current on the DC power bus, offset the above drawbacks. Those developed to date use commercially available electronic transmitter and/or receiver communication modules, sold off the shelf and using traditional modulations of the FSK (Frequency Shift Keying), ASK (Amplitude Shift Keying) and/or PSK (Phase Shift Keying) type. For example, the component by the company STMicro Electronics, bearing reference ST 7540 and based on FSK-type modulation, is widely used.

However, the latter solutions have drawbacks, on the one hand due to a high induced complexity and cost, and on the other hand related to reliability. In fact, the temperature operating ranges are limited to no more than 85° C., whereas during operation, the average temperature of the photovoltaic modules may vary between 30° C. and 50° C., and the maximum temperature may reach 95° C. when the photovoltaic modules are not ventilated.

Thus, solutions that are as non-complex as possible to implement and that make it possible to withstand high temperatures of up to 100° C. are sought.

The technical problem is to propose a system for low data-rate communication over a direct carrier current that reliably conveys payload messages, transmitted asynchronously and at an average frequency from a plurality of communication transmitters to a same receiver, and that uses a communication protocol that is both easy to implement and robust due to its ability to withstand high operating temperatures and the interference that the equipment of the system must withstand.

To that end, the invention relates to a system for low data-rate communication over a modulated direct carrier current, designed to convey payload messages, transmitted asynchronously and at an average frequency from one or a plurality of at least two communication transmitters to a same receiver, through a wire bus using direct carrier current connecting the transmitters and the receiver to each other in series, comprising one or a plurality of at least two communication transmitters, a communication receiver, a wire bus with modulated direct carrier current forming a shared transmission channel and connecting the communication transmitters from the plurality and the communication receiver, each communication transmitter being configured to form a first raw transmission frame in the form of a first sequence of a first constant number Nt of binary raw data, encoded over two states chosen from among 0 and 1, the binary raw data sequence forming a first frame being subdivided into a unique and different physical address characterizing the transmitter, a payload, and an error detecting code on the first frame determined from the payload and the physical address of the communication transmitter, characterized in that each communication transmitter is configured to spread in frequency, by a predetermined spreading factor SF, the first raw transmission frame in a second spread transmission frame in terms of transmission spectrum, the second spread transmission frame assuming the form of a second sequence of chips and being obtained, by first successively encoding the binary raw data of the first raw transmission frame into symbols with a length of a second predetermined number Ns according to a bijective correspondence rule between the set of all possible sequences of binary raw data with length the second number Ns and a set of two to the power Ns symbols, then next by including each obtained symbol in a distinct spreading elementary encoding sequence formed by binary chips, encoded over two states chosen from among 0 and 1, the distinct elementary encoding sequence for spreading depending on the symbol and having for length, a third predetermined integer number of chips defined as the spreading factor SF, and modulating and transmitting, over the wire bus, the chips of the second spread frame in a transmitted communication signal according to a predetermined modulation, in that each elementary spreading sequence is chosen from among the possible chip sequences, with spreading factor SF as length, so as to form a balanced code having a central autocorrelation peak having a first level that is clearly higher than that second levels of the correlation products having correlation shifts, the duration of which is greater than or equal to a chip period, in that the elementary encoding sequences for spreading the symbols used by all of the transmitters are identical, and in that the times of the initial transmission of the second spread frames developed by each transmitter are autonomously and freely determined by each transmitter, without taking a synchronization signal outside the transmitter into account.

According to specific embodiments, the system for low data-rate communication over a direct carrier current as defined above comprises one or more of the following features:

each transmitter comprises a unique and different associated module for creating times of the initial transmission of the second spread frames, randomly or pseudo-randomly distributed and separated by a rational number of chip periods greater than or equal to zero, to create time intervals with variable lengths separating the second spread frames coming from different transmitters and desynchronize said received second spread frames;

the number of symbols, equal to the number of elementary sequences, is comprised in the set of integers 2, 4, 8, and the spreading factor is greater than or equal to 4, preferably equal to 16;

the set of elementary encoding sequences consists of a first set of basic elementary encoding sequences and a second set of elementary encoding sequences each having the same cardinal, each of the elementary encoding sequences of the second set being the complementary encoding sequence of a basic elementary encoding sequence corresponding to the first set;

the modulation of the chips implemented by the communication transmitters is a modulation of the off/on keying (OOK) type according to which the 0 state of a chip corresponds to a first voltage level on the bus, and the 1 state of the chip corresponds to a second voltage level different from the first on the bus;

each communication transmitter comprises a pulse generator to implement the modulation of the chips on the bus, and the pulse generator may be chosen to be a current controlled generator, a voltage controlled generator, and an impedance controlled modulator;

the receiver is configured to filter and amplify a received communication signal as being the sum of the communication signals emitted by the communication transmitters and conveyed to an input of the communication receiver, and sampling the received signal, the direct component of which has been eliminated, in received signal samples according to sampling moments repeated at least at a frequency equal to twice the transmission frequency of the chips, the sampling moments following one another according to a fourth predetermined number Nphi, greater than or equal to two, of phases repeated cyclically according to a period equal to the duration of the chip and each identified by a phase rank comprised between 1 and Nphi, after each sampling moment and from a previous number of first samples with the same phase rank as that of the sampling moment, equal to the product of the spreading spectrum SF times the total number of binary data Nt of a frame divided by the length Ns of a symbol, determining a third raw reception frame using a sliding frame window correlation unit and the set of elementary sequences, then from the third frame, verifying whether the error detection code of the third determined frame detects the third erroneous frame, and when no error is detected by the error detection code, extracting the transmitter's address and comparing it to a predetermined list of transmitters;

the sliding frame window correlation unit of the receiver is configured to after each sampling moment and from a number of previous first samples, with the same phase rank as that of the sampling moment, equal to the spreading factor SF, compute, in parallel over a set of transformed correlation replicas and over the set of possible shift configurations for each transform correlation replica, the possible correlation products, the transformed correlation replicas either being obtained by respective transformation of levels 0, 1 of the set of spreading encoding sequences into levels $-1$, 1, or obtained by transforming the levels 0, 1 of half of the basic elementary transmission encoding sequences with no complementarity between them into levels $-1$, 1 when the elementary transmission sequences consist of a first set of basic elementary encoding sequences and a second set of elementary encoding sequences complementary to the basic ones of the first set, and detecting the received symbol as being the symbol corresponding to either the elementary encoding sequence associated with the transformed correlation replica of the computed correlation product having the highest level when the respective cardinals of the set of encoding elementary sequences and the set of transformed correlation replicas are equal, or the elementary encoding sequence associated with the transformed correlation replica of the computed correlation product having the highest positive level when the cardinal of the set of encoding elementary sequences is twice the cardinal of the set of transformed correlation replicas, or the complementary elementary encoding sequence of the basic elementary encoding sequence associated with the transformed correlation replica of the correlation product having the highest negative level calculated when the cardinal of the set of basic elementary sequences is twice the cardinal of the set of transformed correlation replicas, then decoding the symbol in the sequence of Ns corresponding bits and entering the binary data in a shift register having the length Nt of a third frame as its length; and the list of predetermined transmitters is a list provided and determined at the receiver when it is installed or is a list of transmitters built from statistical filtering implemented on the transmitter addresses extracted from the third frames for which no error is detected by the error detection code.

The invention also relates to a method for low data-rate communication over a modulated direct carrier current implemented by a communication system as defined above, designed to convey payload messages, transmitted asynchronously and at an average frequency from one or a plurality of at least two communication transmitters to a same communication receiver through a wire bus using direct carrier current connecting the communication transmitters and the communication receiver to each other in series, the step consisting of the following:

each communication transmitter forms a first raw transmission frame in the form of a first sequence of a first constant number Nt of binary raw data, encoded over two states chosen from among 0 and 1, the binary raw data sequence forming a first frame being subdivided into a unique and different address characterizing the transmitter, a payload, and an error detecting code on the first frame determined from the payload and the address of the transmitter, and the method further comprises the following steps:

each transmitter spreads in frequency, by a predetermined spreading factor SF, the first raw transmission frame in a second spread transmission frame in terms of transmission spectrum, the second spread transmission frame assuming the form of a second sequence of chips and being obtained, by first successively encoding the binary raw data of the first raw transmission frame into symbols with a length of a second predetermined number Ns according to a bijective correspondence rule between the set of all possible sequences of binary raw data with length the second number Ns and a set of two to the power Ns symbols, then by including each obtained symbol in a distinct spreading elementary encoding sequence formed by binary chips, encoded over two states chosen from among 0 and 1, the distinct elementary encoding sequence for spreading depending on the symbol and having for length, a third predetermined integer number of chips defined as the spreading factor SF, then each transmitter modulates and transmits, over the wire bus, the chips of the second spread frame in a transmitter signal according to a predetermined modulation, each elementary transmission sequence being chosen from among the possible chip sequences, with spreading factor SF length, so as to form a balanced code having a central autocorrelation peak having a first level that is clearly higher than that second levels of the correlation products having correlation shifts, the duration of which is greater than or equal to a chip period, and the elementary encoding sequences for spreading the symbols used by all of the communication transmitters being independent of the communication transmitter, and the times of the initial transmission of the second spread frames developed by each communication transmitter being autonomously and freely determined by each communication transmitter, without taking a synchronization signal outside the communication transmitter into account.

According to specific embodiments, the communication method includes one or more of the following features:

the communication receiver filters and amplifies a received communication signal as being the sum of the communication signals emitted by the transmitters and conveyed to an input of the receiver, and the communication receiver samples the received communication signal, the direct component of which has been eliminated, in received signal samples according to sampling moments repeated at least at a frequency equal to twice the transmission frequency of the chips, the sampling moments following one another according to a fourth predetermined number Nphi, greater than or equal to two, of phases repeated cyclically according to a period equal to the duration of the chip and each identified by a phase rank comprised between 1 and Nphi, and after each sampling moment and from a previous number of first samples with the same phase rank as that of the sampling moment, equal to the product of the spreading spectrum SF times the total number of binary data Nt of a frame divided by the length Ns of a symbol, the receiver determines a third raw reception frame using a sliding frame window correlation unit and the set of elementary sequences, then from the third frame, the receiver verifies whether the error detection code of the third determined frame detects the third erroneous frame, and when no error is detected by the error detection code, the receiver extracts the transmitter's address and compares it to a predetermined list of transmitters.

The invention also relates to a corresponding low-rate communication transmitter, comprising a first module for forming a first raw transmission frame in the form of a first sequence of a first constant number Nt of binary raw data, encoded over two states chosen from among 0 and 1, the binary raw data sequence forming a first frame being subdivided into a unique and different address characterizing the transmitter, a payload, and an error detecting code on the first frame determined from the payload and the address of the transmitter, comprising a second module configured to spread in frequency, by a predetermined spreading factor SF, the first raw transmission frame in a second spread transmission frame in terms of transmission spectrum, the second spread transmission frame assuming the form of a second sequence of chips and being obtained, by first successively encoding the binary raw data of the first raw transmission frame into symbols with a length of a second predetermined number Ns according to a bijective correspondence rule between the set of all possible sequences of binary raw data with length the second number Ns and a set of two to the power Ns symbols, then by including each obtained symbol in a distinct spreading elementary encoding sequence formed by binary chips, encoded over two states chosen from among 0 and 1, the distinct elementary encoding sequence for spreading depending on the symbol and having for length, a third predetermined integer number of chips defined as the spreading factor SF, and a pulse generator to modulate and transmit, over the wire bus, the chips of the second spread frame in a transmitted communication signal according to a predetermined modulation, each elementary transmission sequence being chosen from among the possible chip sequences, with spreading factor SF length, so as to form a balanced code having a central autocorrelation peak having a first level that is clearly higher than that second levels of the correlation products having correlation shifts, the duration of which is greater than a chip period, and the times of the initial transmission of the two frames developed by the transmitter being autonomously and freely determined by each transmitter, without taking a synchronization signal outside the transmitter into account.

The invention also relates to a corresponding low-rate communication receiver designed to be integrated into a system as defined above, comprising an analog head for filtering and amplifying a received communication signal as being the sum of the communication signals emitted by the communication transmitters and conveyed to an input of the receiver, and a unit for sampling the received signal, the direct component of which has been eliminated by the analog head, in received signal samples according to sampling moments repeated at least at a Nyquist frequency substantially equal to twice the transmission frequency of the chips, the sampling moments following one another according to a fourth predetermined number Nphi, greater than or equal to two, of phases repeated cyclically according to a period equal to the duration of the chip and each identified by a phase rank comprised between 1 and Nphi, a processing unit configured to, after each sampling moment and from a previous number of first samples with the same phase rank as that of the sampling moment, equal to the product of the spreading spectrum SF times the total number of binary data N of a frame divided by the length Ns of a symbol, determining a third raw reception frame using a sliding frame window correlation unit and the set of elementary sequences, then from the third frame, verifying whether the error detection code of the third determined frame detects the third erroneous frame, and when no error is detected by the error detection code, extracting the transmitter's address and comparing it to a predetermined list of transmitters.

The invention also relates to a computer program product comprising program code instructions to implement the steps of the communication method as defined above when said program operates on one or more digital computers of a communication system as defined above.

The invention will be better understood and other advantages thereof will appear more clearly upon reading the following description of several embodiments of the invention, provided solely as an example and done in reference to the appended drawings, in which.

Figure 1:
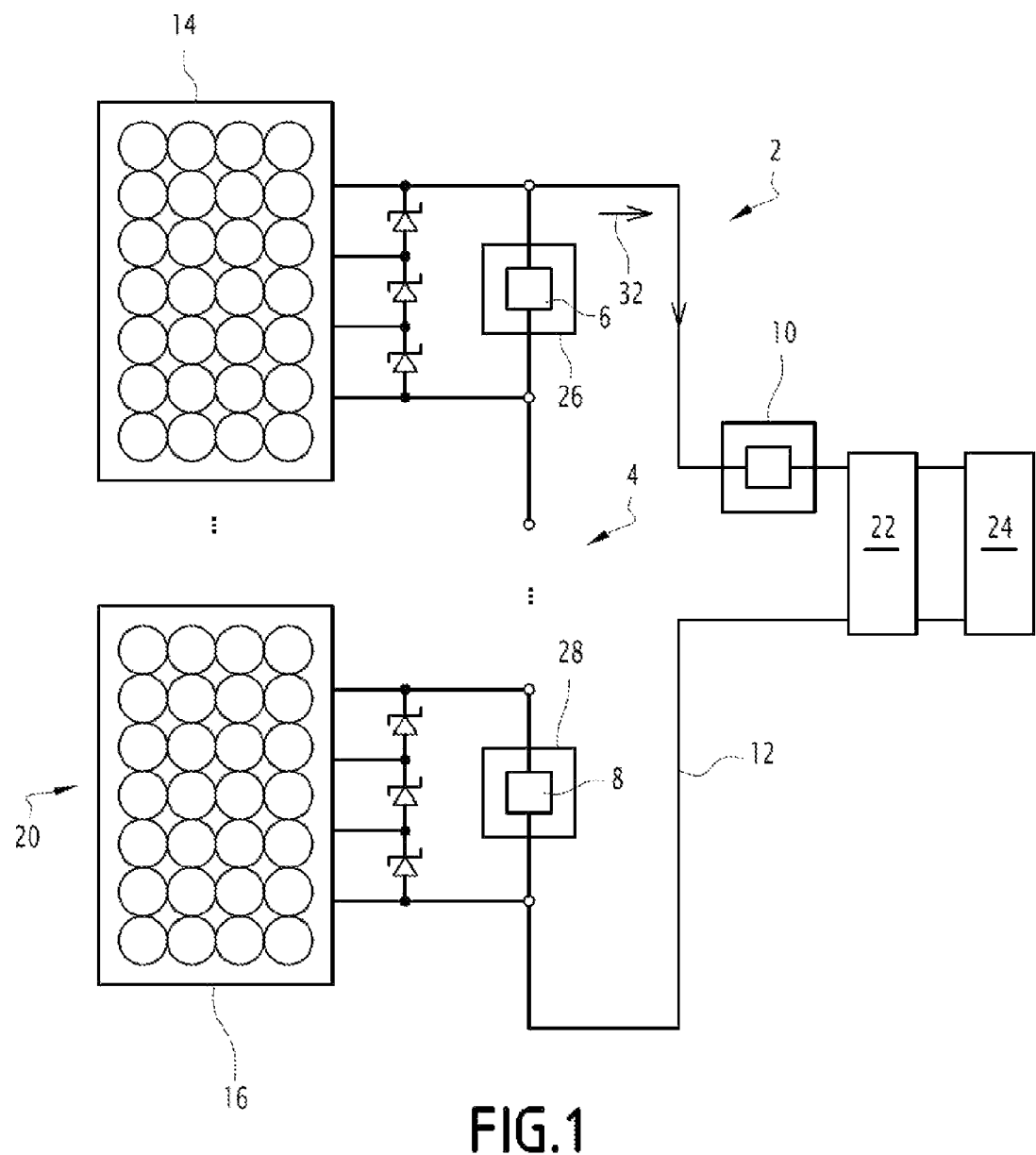
FIG. 1 is a view of the general architecture of a communication system according to the invention integrated into a photovoltaic power system.

According to FIG. 1, a system 2 for low data-rate communication over a carrier current comprises a plurality 4 of communication transmitters, only two of which are shown in FIG. 1 and designated by references 6 and 8, a communication receiver 10, and a communication wire bus 12 with DC carrier current, connecting the communication transmitters 6, 8 and the receiver 10 in series.

Here, each communication transmitter 6, 8 of the plurality 4 is respectively associated with a photovoltaic module 14, 16, the photovoltaic modules being connected in series by their outputs through the wire communication bus 12 to form a photovoltaic power source 20.

The photovoltaic power source 20 is coupled to a power converter 22 powering an electric charge network 24.

Thus, the wire communication bus 12 with DC current here constitutes both a DC current output power bus with respect to the photovoltaic modules and a modulated wire communication bus with DC carrier current with respect to the transmitters 6, 8 and the communication receiver 10.

Each communication transmitter 6, 8 is respectively incorporated into a unique and different monitoring module 26, 28, configured to provide minute remotely-measured monitoring data for the associated photovoltaic module 14, 16. For each photovoltaic module and each time a sampled data message is sent, the remotely measured data relates to the voltage of the photovoltaic module in volts and the temperature of the transmitter at the sending moment, and here for example assumes the form of a payload occupying two bytes.

The communication system 2 is configured to convey the remote measurement payload messages, transmitted asynchronously and at an average frequency from the plurality of communication transmitters to the remote measurements receiver 10, connected in series on the communication bus 12 between the communication transmitters 4, 6 and the inverter 22, and downstream from the communication transmitters 4, 6 in the direction of the carrier current represented by an arrow 32.

Here, the monitoring modules 26, 28 respect the requirement that they must transmit data at intervals not predictably determined over time, i.e., random, but nevertheless at least at the frequency of one transmission per minute for each of the photovoltaic modules.

Figure 2:
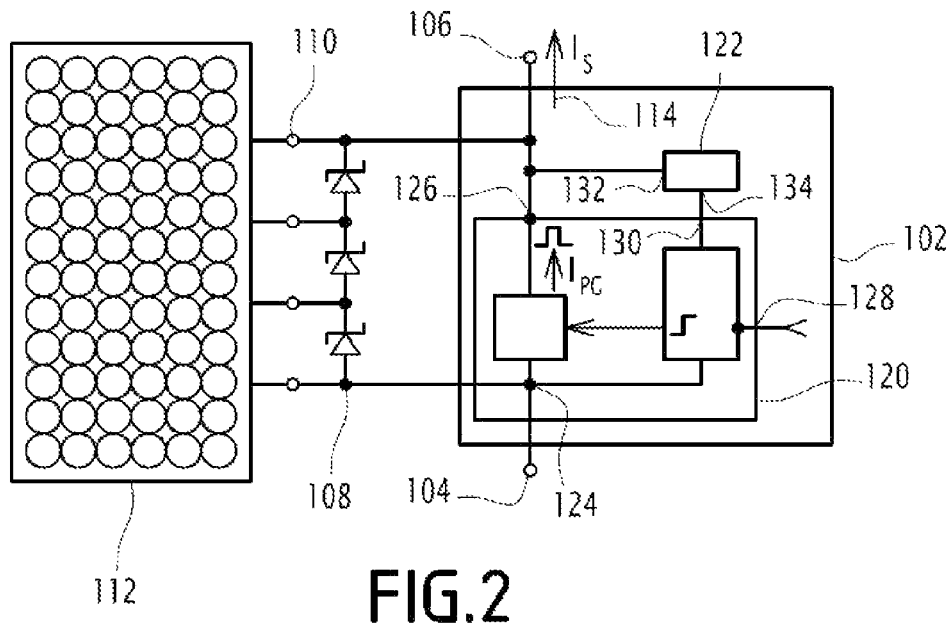
FIG. 2 is a view of the general architecture of a communication transmitter of the communication system of FIG. 1.

According to FIG. 2, a generic monitoring module 102 representing any monitoring module considered from among the monitoring modules 26, 28 of the photovoltaic modules 14, 16 of the photovoltaic power source 20 comprises a first input terminal 104 of the bus 12 and a second output terminal 106 of the bus, respectively connected to a first output 108 and a second output terminal 110 of the generic photovoltaic module, designated by reference 112 and representing any photovoltaic module from the plurality 4 of photovoltaic modules. The current leaving the bus is an output current of the second output terminal 110 in the direction of the arrow designated by 114.

The monitoring module 102 comprises a communication transmitter 120 and a unit 122 for measuring the output voltage of the photovoltaic module 112.

The communication transmitter 120 comprises a first input terminal 124 and a second output terminal 126 respectively connected to the first input terminal 104 of the bus and the second output terminal 106 of the bus.

The communication transmitter 120 also comprises a third input terminal 128 for remote measurement and a fourth input terminal 130 for remote measurement for respectively receiving a temperature measurement from a temperature sensor, not shown in FIG. 2, and a measurement of the voltage of the generic photovoltaic module 112 by the voltage measuring unit 122.

The unit for measuring the voltage 122 comprises a first terminal 132 taking a measurement and a second measurement supply terminal 134, respectively connected to the second output terminal 106 of the bus 12 and the fourth input terminal 130 for remote measurement of the communication transmitter 120.

Figure 3:
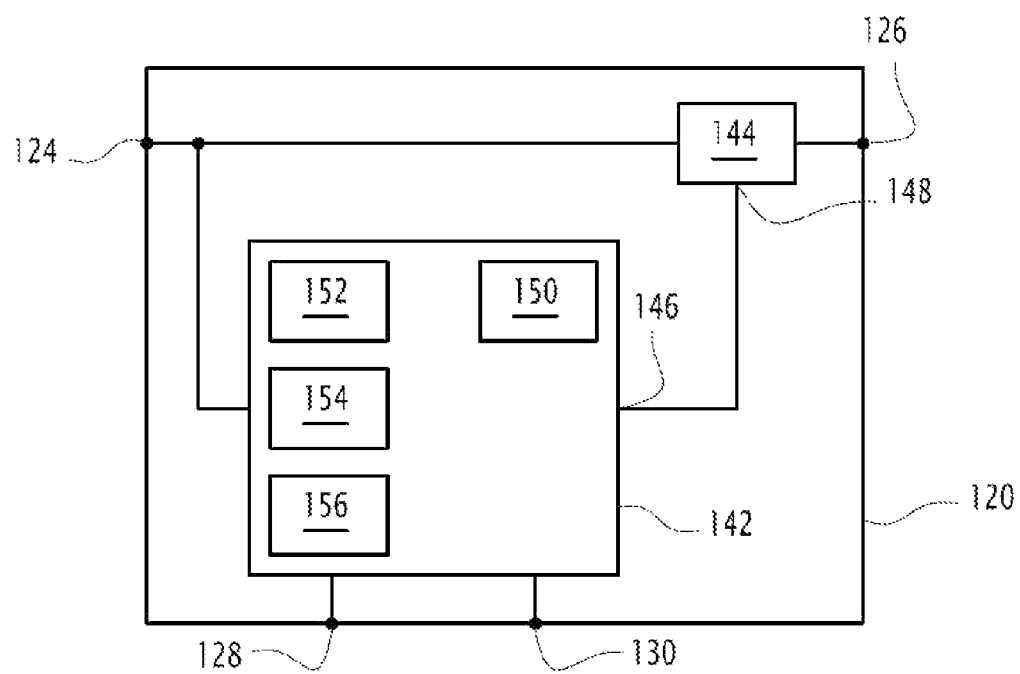
FIG. 3 is a view of the detailed architecture of the digital modules of the communication transmitter of FIG. 2.

According to FIG. 3, each communication transmitter 6, 8, one representative of which is the generic communication transmitter 120 of FIG. 2, includes external interface terminals identical to those of FIG. 2, i.e., the first input terminal 124, the second output terminal 126, the third input terminal 128 for remote measurement and the fourth input terminal 130 for remote measurement.

The communication transmitter 120 comprises a digital computer 142 and a pulse generator 144.

The digital computer 142 here is a microprocessor or microcontroller with a traditional architecture, qualified over a broad temperature range and able to operate at an upper temperature exceeding 100° C.

The digital computer 142, connected to the third and fourth remote measurement input terminals 128, 130, includes an output terminal 146 connected to a modulating input terminal 148 of the pulse generator 144 and an internal reference clock 150 specific to the communication transmitter.

The digital computer 142 is configured to implement digital processing for transforming the sampled digital remote measurement data provided to the third and fourth input terminals 128, 130 into a modulating communication message containing the sampled and digitized remote measurement information.

The digital processing is implemented in the form of software modules executed sequentially.

A first module 152 for forming a first frame is configured to form a first raw transmission frame in the form of a first sequence of a first constant number Nt of binary raw data or bits, encoded over two states chosen from among 0 and 1. The sequence of binary raw data forming the first frame is subdivided into a unique and different physical address characterizing the transmitter, a payload, and an error detection code for the first frame determined from the payload in the address of the transmitter. The payload contains the sampled remote measurement data, here the temperature and output voltage of the module, while the physical address of the transmitter is an address loaded during the on-site installation or loaded beforehand in the factory. The error detection code is computed based on a predetermined algebraic algorithm of the polynomial type.

A second frequency spreading module 154 is configured to spread, using a predetermined spreading factor denoted SF, the first raw transmission frame into a second transmission frame spread in terms of transmission spectrum. The second spread transmission frame assumes the form of a second sequence of chips. The second spread transmission frame is developed by first encoding the binary raw data of the first raw transmission frame taken successively by words with a length of a second predetermined number Ns of bits, called symbols, according to a bijective correspondence rule between the set of all possible sequences of binary raw data or words with lengths Ns and a set of two to the power Ns symbols, then next encoding each obtained symbol in a distinct elementary encoding, transmission and spreading sequence, formed by a series of binary chips, encoded over two states chosen from among 0 and 1. The elementary encoding sequence therefore depends on the symbol and has, for length, a same third predetermined integer number of chips defined as the spreading factor SF. Each elementary spreading encoding sequence is determined and results from a prior design choice of the transmitter and the communication system. During the phase for designing the second module and the second communication system, each elementary spreading encoding sequence has been chosen from among the possible sequences of chips, with the spreading factor SF as length, so as to form a balanced code having a central self-correlation peak having a first level that is clearly higher than any one of the second levels of the auto-correlation products for which the absolute value of the correlation shift is greater than or equal to the duration of a chip. The ratio of any of the second levels to the first level remains less than or equal to 0.3.

The elementary spreading encoding sequences of the symbols used by all of the transmitters are the same, i.e., generic and independent of the communication transmitter. Only the physical address characterizes and makes it possible to identify the communication transmitter.

Thus, the transmission moments of the spread second frames developed by any given transmitter, identified by its physical address, are autonomously and freely determined by the transmitter without taking a synchronization signal external to the transmitter into account. The communication protocol thus obtained is simplified and more robust due to the lack of signals exchanged between the communication transmitters and/or the transmitters and the communication receiver.

In particular, the obtained communication protocol makes it possible to eliminate the sending of a synchronization beacon by the central station, even if the monitoring modules send the data at intervals not predictably determined over time, i.e., random, and at least at the frequency of one transmission per minute for each of the photovoltaic modules.

Here, a third module 156 for creating hops of the times of the initial transmission of the second frames is configured to generate, according to a unique and different sequence dependent on the physical address of the communication transmitter, times of the initial transmission of the second spread frames, distributed randomly or pseudo-randomly so as to create time intervals with variable lengths separating two spread second frames of consecutive chips.

The time intervals with variable lengths determined by the third module 156 are for example created by a pseudorandom number generator according to a predetermined algorithm.

One easy-to-implement and effective algorithm for generating random numbers is for example the MWC (Multily-With-Carry) algorithm developed by G. Marsaglia, which can generate a very large number of random sequences of very long periods based on the physical address of the communication transmitter, considered to be an input parameter for the sequence generated by the algorithm.

Thus, the presence within each communication transmitter of a third module 156, unique and different due to its random sequence of the times of the initial transmission of the second frames, decreases the frequency of the event during which two frames transmitted by two different transmitters become superimposed in reception so as to coincide, i.e., during which at least two symbols become superimposed synchronously, making it impossible to resolve the collision between the two frames.

Alternatively, the digital computer of each communication transmitter has no third module. This configuration causes a deterioration of the transmission capacity, but the reliability of the communication system is preserved.

Figure 4:
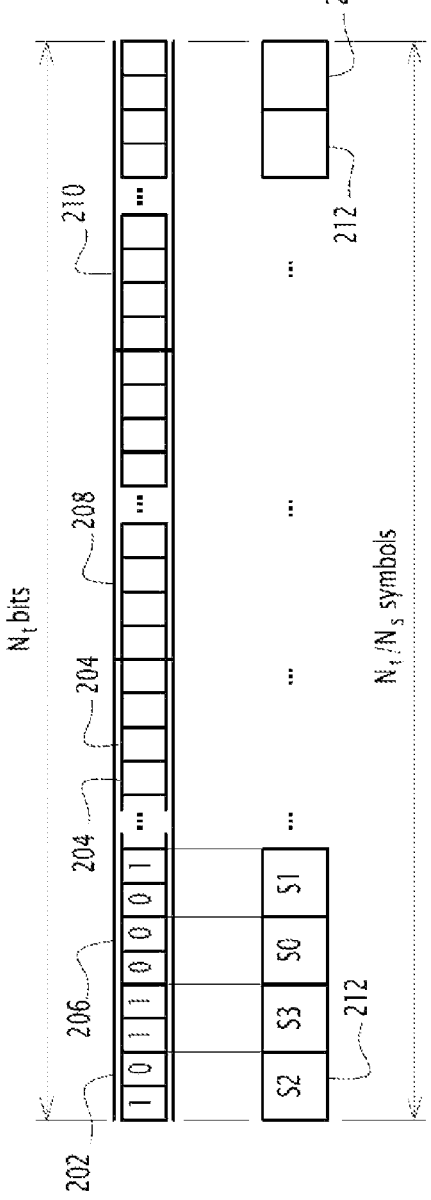
FIG. 4 is a general view of a first embodiment of a protocol for encoding digital frames implemented by the communication transmitter of FIGS. 2 and 3.

According to FIG. 4 and a first embodiment, a first raw frame 202 here is a sequence of 64 bits 204, i.e., in which the first integer number Nt is equal to 64.

The sequence of bits 204 forming the first frame 202 is distributed between a physical address 206 of 32 bits distinctively characterizing the transmitter, a payload 208, here 16 bits, containing eight bits for remote measurement of the output voltage of the photovoltaic module and eight bits for the remote measurement of the temperature of the environment of the photovoltaic module, and an error correction code 210 of sixteen bits for error detection and blind resolution of the physical addresses.

The physical address 206 bits uniquely and differently characterizing each of the transmitters is saved in a flash memory of the digital computer.

The error detection code 210, designated using the acronym CRC (Cyclic Redundancy Check), is the code with a length of 16 bits normalized by the ANSI and having as generator polynomial $X^{16}+X^{15}+X^2+1$.

The first transmission frame 202 is divided into a series of words 212 of two bits, each word being encoded in a corresponding symbol, the symbols being governed according to the following bijective correspondence rule: word 00 has a corresponding symbol S0, word 01 has a corresponding symbol S1, word 10 has a corresponding symbol S2, word 11 has a corresponding symbol S3.

Figure 5:
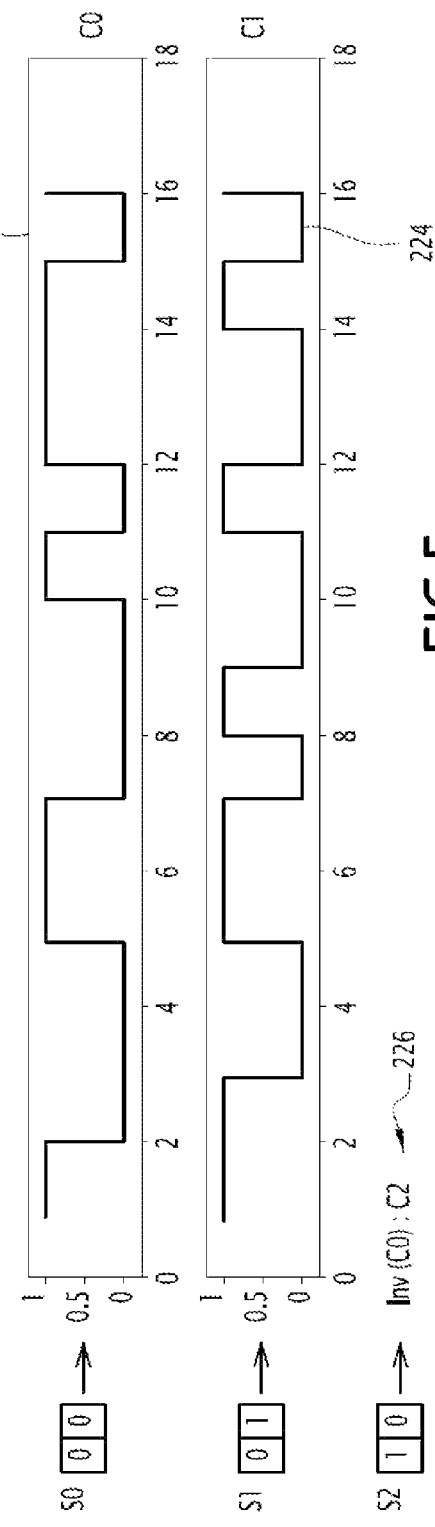
FIG. 5 is a detailed view of the encoding protocol according to the first embodiment of FIG. 4.

According to FIG. 5, each symbol is encoded over a different elementary chip-encoding sequence made up of 16 binary chips, each chip having a state chosen from among the possible states 0 and 1.

Here, the symbol S0 is encoded over a first encoding and base sequence of sixteen chips 222, designated by C0, which is written 8C5D in hexadecimal notation over two bytes.

Symbol S1 is encoded over a second encoding and base sequence of sixteen chips 224, designated by C1, which is written CD25 in hexadecimal notation over two bytes.

Symbol S2 is encoded over a third encoding and base sequence of sixteen chips 226, designated by C2, which is the inverse sequence with respect to the direction of the Boolean addition of the first encoding sequence 222 with base C0.

Symbol S2 is encoded over a third encoding and base sequence of sixteen chips 228, designated by C3, which is the inverse sequence with respect to the direction of the Boolean addition of the first encoding sequence 224 with base C1.

Thus, through the successive encoding of the bits in symbols, and symbols in elementary chip-encoding sequences, the first raw frame is transformed into a second frame with a length of 512 chips.

The elementary encoding sequences 222, 224, 226, 228 have been chosen in order to meet the following requirements.

The elementary encoding sequences 222, 224, 226, 228 are balanced, i.e., each having the same number of zeros and ones, which makes decoding easier.

Independently of the second frame constructed as a random sequence of symbols S0, S1, S2, S3 encoded in the elementary encoding sequences C0, C1, C2, C3, the number of successive chips in a same state, i.e., 0 or 1, is less than or equal to 3, which eliminates the direct component and the low-frequency components in the transmitted signal, and which makes the analog receiving head at the input easier to produce.

The auto-correlation properties of each elementary encoding sequence 222, 224, 226, 228 are good in terms of expected performance on the output of the correlator of the receiver, i.e., a high signal amplitude in the absence of correlation shift and an amplitude of the side lobes significantly lower in the presence of a correlation shift.

The cross-correlation properties between the first two basic encoding sequences 222, 224 are good in terms of a low correlation level independently of the correlation shift, which makes it possible to obtain a high signal-to-noise ratio at the output of the correlator of the receiver.

Figure 6:
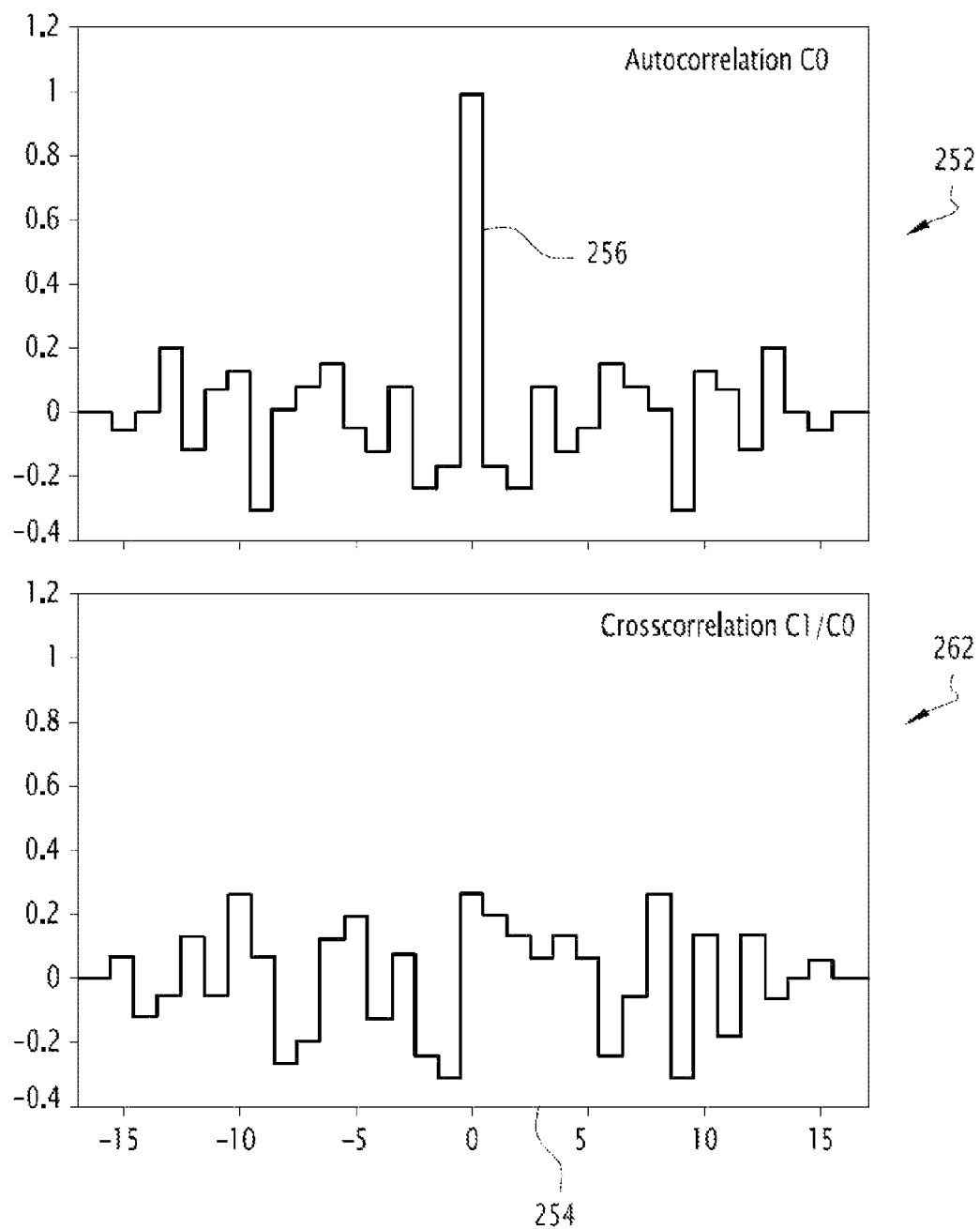
FIGS. 6 and 7 are views of the correlation properties of the two elementary encoding sequences used in the first embodiment of the encoding protocol of FIGS. 4 and 5.

According to FIG. 6, a first tracing 252 of the evolution curve of the autocorrelation product of the first basic sequence 222, corresponding to the encoded symbol S0, as a function of a correlation delay expressed in number of chip periods on an x-axis 254, clearly shows a narrow central autocorrelation peak 256.

The values of the autocorrelation product obtained for absolute values of algebraic delays comprised between 1 and 15, inclusive, remain less than or equal to 0.3.

According to FIG. 6, a second tracing 262 of the evolution curve of the cross-correlation product of the second basic sequence 224, corresponding to the encoded symbol S1, by the first basic sequence 222, corresponding to the encoded symbol S0, as a function of the algebraic correlation delay expressed in number of chip periods on the x-axis 254, shows that for any value of the algebraic delay, the cross-correlation product remains less than or equal to 0.3.

Figure 7:
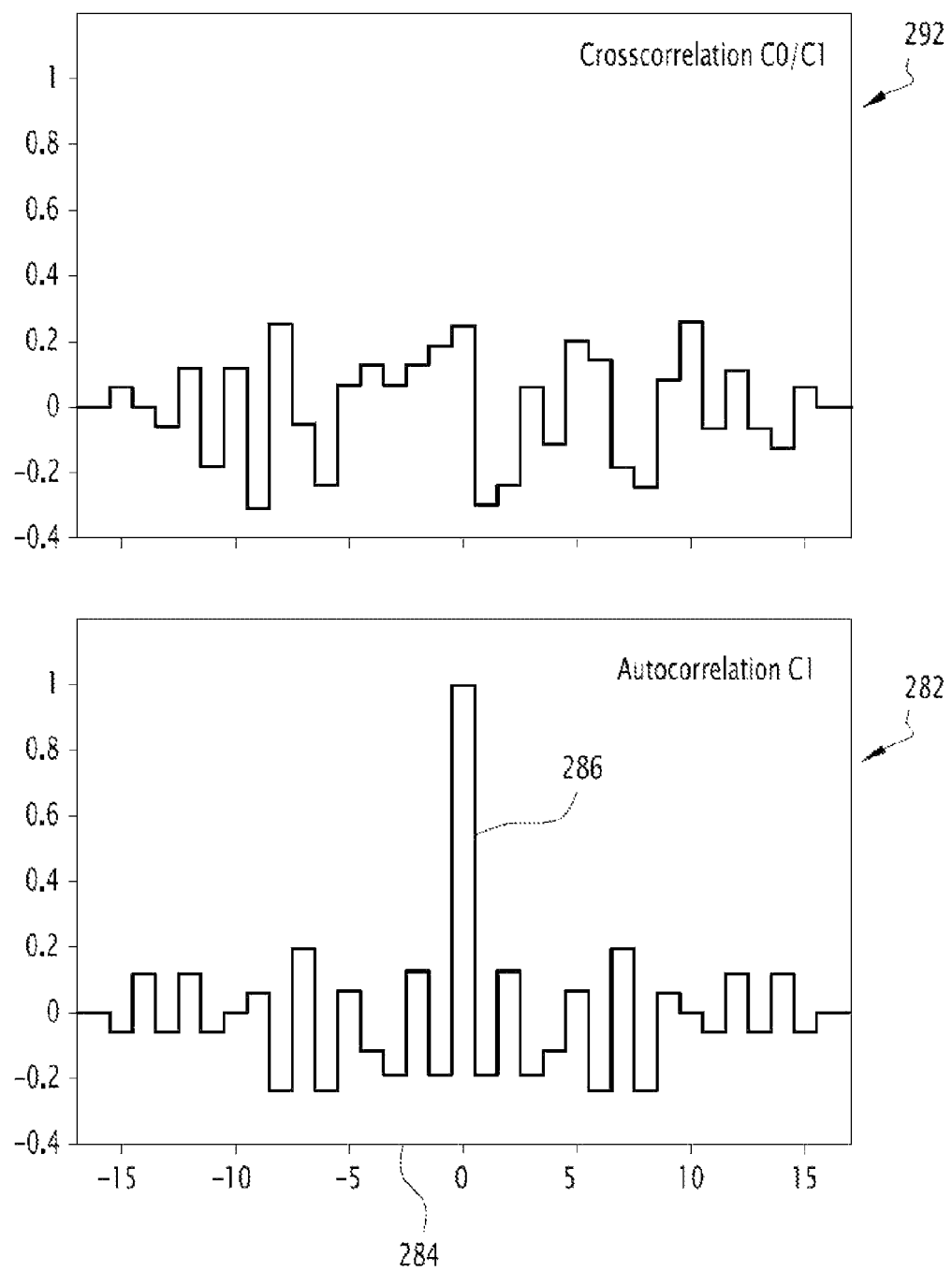

According to FIG. 7, a first tracing 282 of the evolution curve of the autocorrelation product of the second basic sequence 224, corresponding to the encoded symbol S1, as a function of a correlation shift expressed in number of chip periods on an x-axis 284, clearly shows a narrow central autocorrelation peak 286.

The values of the autocorrelation product obtained for absolute values of algebraic delays comprised between 1 and 15, inclusive, remain less than or equal to 0.3.

According to FIG. 7, a second tracing 292 of the evolution curve of the cross-correlation product of the first basic sequence 222, corresponding to the encoded symbol S0, by the second basic sequence 224, corresponding to the encoded symbol S1, as a function of the algebraic correlation delay expressed in number of chip periods on the x-axis 284, shows that for any value of the algebraic delay, the cross-correlation product remains less than or equal to 0.25.

It should be noted that the cross-correlation properties of the first basic encoding sequence 222 with the third complementary encoding sequence 226, respectively the properties of the cross-correlation of the second basic encoding sequence 224 with the fourth complementary encoding sequence 228, each lead to a negative central peak with a high amplitude, while the amplitude of the correlation products corresponding to non-zero correlation shifts is small.

Figure 8:
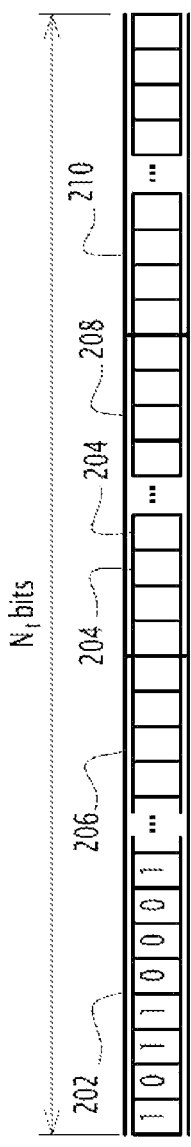
FIG. 8 is a general view of a second embodiment of a protocol for encoding digital frames implemented by the communication transmitter of FIGS. 2 and 3.

According to FIG. 8 and a second embodiment of the transmission protocol, a first raw transmission frame has the same structure as the first transmission frame 202 described in the first embodiment described in FIG. 4, i.e., a sequence of 64 bits 204, distributed in the physical address 206 of the transmitter, the payload 208 containing the remote measurement data, and the error detection code CRC 210.

Here, the notions of symbol and bit are combined and two symbols can be distinguished: a first symbol SB0 corresponding to a bit in state 0 and a second symbol SB1 corresponding to a bit in state 1.

Figure 9:
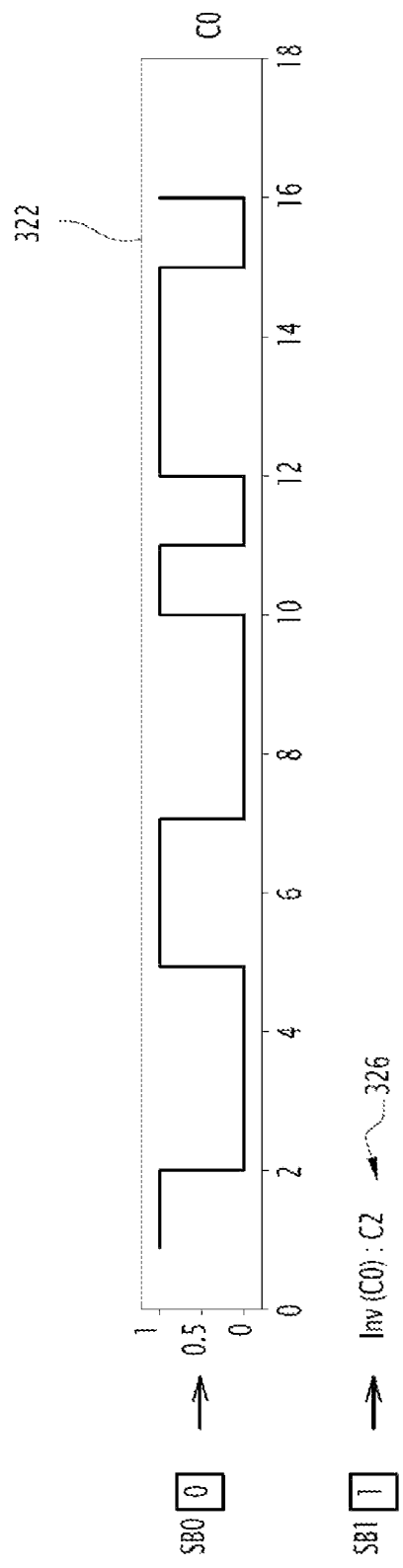
FIG. 9 is a detailed view of the encoding protocol according to the second embodiment of FIG. 4.
Figure 10:
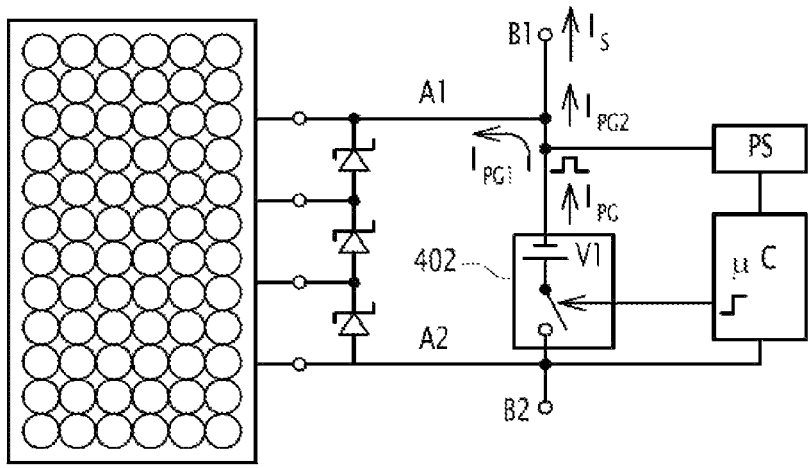
FIGS. 10, 11, 12 and 13 are first, second, third and fourth embodiments, respectively, of the pulse generator of the transmitter described in FIGS. 2 and 3.
Figure 11:
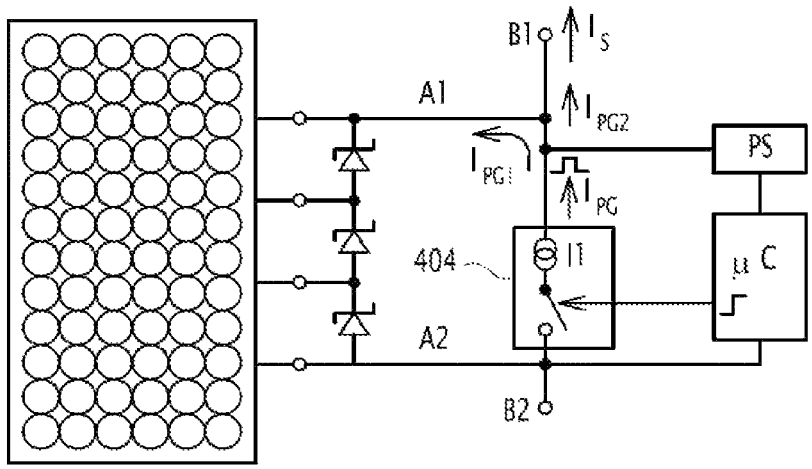
Figure 12:
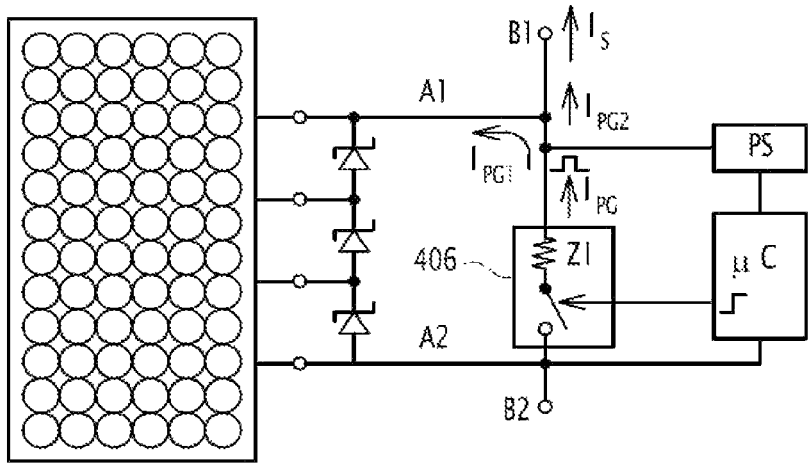
Figure 13:
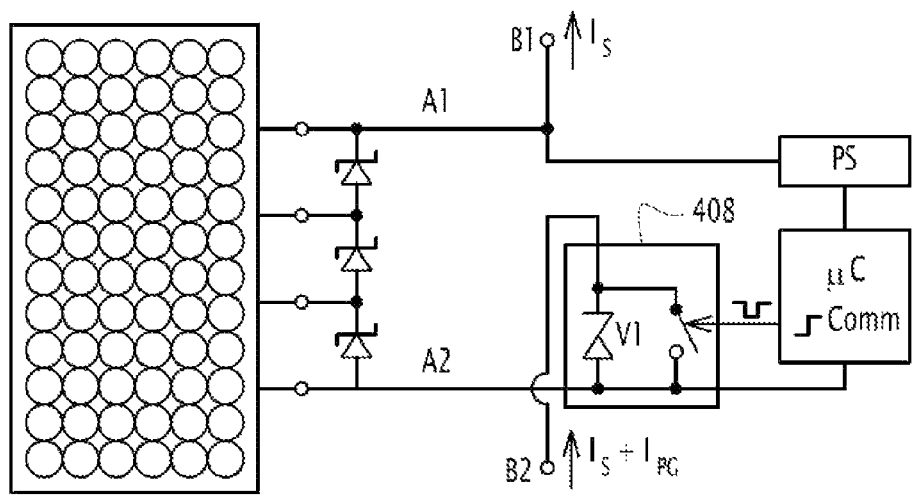

According to FIG. 9, each symbol is encoded over a different elementary spreading sequence made up of 16 binary chips, each chip having a state chosen from among the possible states 0 and 1.

Here, the symbol SB0 is encoded over a first encoding and base sequence of sixteen chips 322 that is the same as that described in FIG. 5 under reference 222 and that is written 8C5D in hexadecimal notation over two bytes.

The symbol SB1 is encoded over a second encoding sequence of sixteen chips 326, which is the inverse sequence with respect to the direction of the Boolean addition of the first encoding sequence 322 and which is identical to the third encoding sequence 226 described in FIG. 5.

Thus, by successive encoding of the bits or symbols, and of the bits in the elementary encoding sequences of corresponding chips, the first raw frame 322 is transformed into a second frame 1024 chips long.

The elementary encoding sequences 322, 326 are then chosen like the elementary encoding sequences 222, 224, 226, 228 in order to meet the following requirements.

The elementary encoding sequences 322, 326 are balanced, i.e., each having the same number of zeros and ones, which makes decoding easier.

Independently of the second frame constructed as a random sequence of encoded symbols SB0, SB1, the number of successive chips in a same state, i.e., 0 or 1, is less than or equal to 3, which eliminates the direct component and the low-frequency components in the transmitted signal, and which makes the analog receiving head at the input easier to produce.

The autocorrelation properties of each elementary encoding sequence 322, 326 are good in terms of expected performance on the output of the correlator of the receiver, i.e., a high signal amplitude in the absence of correlation shift and an amplitude of the side lobes significantly lower in the presence of correlation shifts. The autocorrelation properties of the first elementary encoding sequence 322 are the same as those shown in the tracing of FIG. 6.

It should be noted that the cross-correlation of the first basic encoding sequence 322 with the second complementary encoding sequence 326 leads to a negative central peak with a high amplitude, while the amplitude of the correlation products corresponding to non-zero correlation shifts is low.

According to FIGS. 10, 11, 12 and 13, the pulse generator 144 of FIG. 3 is respectively produced by a first embodiment of a voltage generator 402 with value V1, a current generator 404 with value I1, an impedance modulator 406 with value Z1, and a second embodiment of a voltage generator 408 with value V1 with two states controlled by the control signal from the digital computer.

The values I1, V1, Z1 can be constant or variable, adapting to the operating conditions of the photovoltaic module 112 and the photovoltaic chain.

The current denoted $I_{PG}$ generated by the pulse generator is divided into a first current, denoted $I_{PG1}$ and absorbed by the photovoltaic module 122, and a second current crossing through the photovoltaic chain, i.e., the bus 12 with carrier current. The second current $I_{PG2}$ crosses through the entire transmission chain, in particular the receiver 10 and the input impedance of the inverter denoted Zinv.

By using j to designate an identification index for a module of the supply chain and its associated communication transmitter, and the second corresponding current $I_{PG2}(j)$, that second current verifies the relationship:

$$I_{PG2}(j) = \frac{Z_{mod}(j)}{\sum_{i=1}^{n} (Z_{mod}(i)) + Z_{inv}} \cdot I_{PG} \quad \text{(relationship (1))}$$

in which n designates the number of photovoltaic modules or the number of transmitters of the communication system, $Z_{mod}(j)$ designates the impedance of the module with index j to which the pulse generator is attached.

Since the input impedance of the inverter is very low in the communication frequency band and negligible before the sum of the impedances of the modules, relationship (1) can be simplified as relationship:

$$I_{PG2}(j) \cong \frac{Z_{mod}(j)}{\sum_{i=1}^{n} (Z_{mod}(i))} \cdot I_{PG} \quad \text{(relationship (2))}$$

Each communication signal $I_{PG2}(j)$ crosses through the communication receiver, where, after a current/voltage transformation, the obtained voltage signal is processed.

Figure 14:
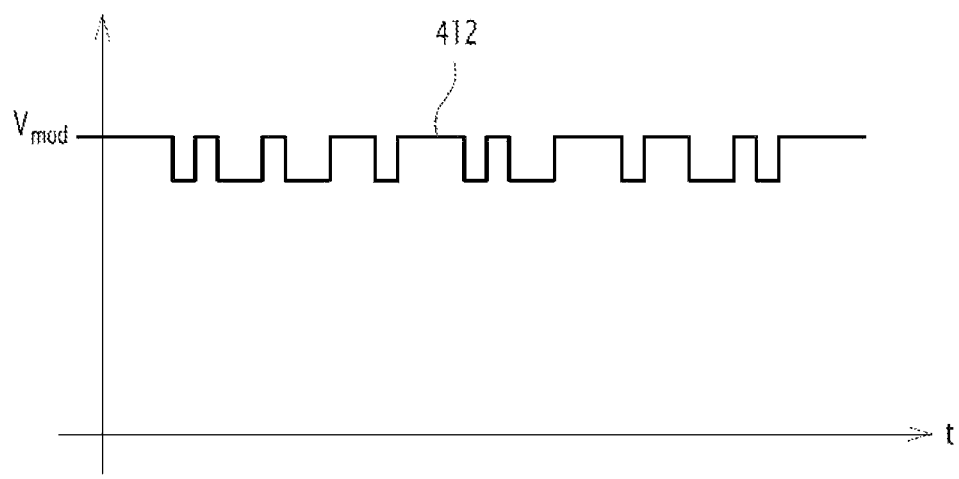
FIG. 14 is a view of a sequence of OOK-modulated chips at the output of the communication transmitter.

According to FIG. 14, one example of the evolution over time 412 of the voltage of a signal modulated and sent by a communication transmitter through its pulse generator is shown.

The module implemented by each communication transmitter through its current pulse generator is a modulation of the on/off keying (OOK) type.

The current pulse generator can also be seen as a voltage OOK modulator, controlled by the chip signal sent by the computer, and which inserts a variable voltage drop in series with the photovoltaic module.

An output voltage modulated through the bus is obtained with two different voltage levels, the amplitude separating the two levels of the pulse being taken to be equal to 5 Volts +/−10%, and the transfer rate here being taken to be equal to 1 kbps (kilobits per second).

The rise time of the rising pulse edges and the descent time of the descending pulse edges have been adjusted so as to reduce the parasitic frequencies outside the transmission spectrum and thus respect the requirements of electromagnetic compatibility (EMC).

Each communication signal $I_{PG2}(j)$ crosses through the communication receiver, where, after a current/voltage transformation, the obtained voltage signal is processed.

Figure 15:
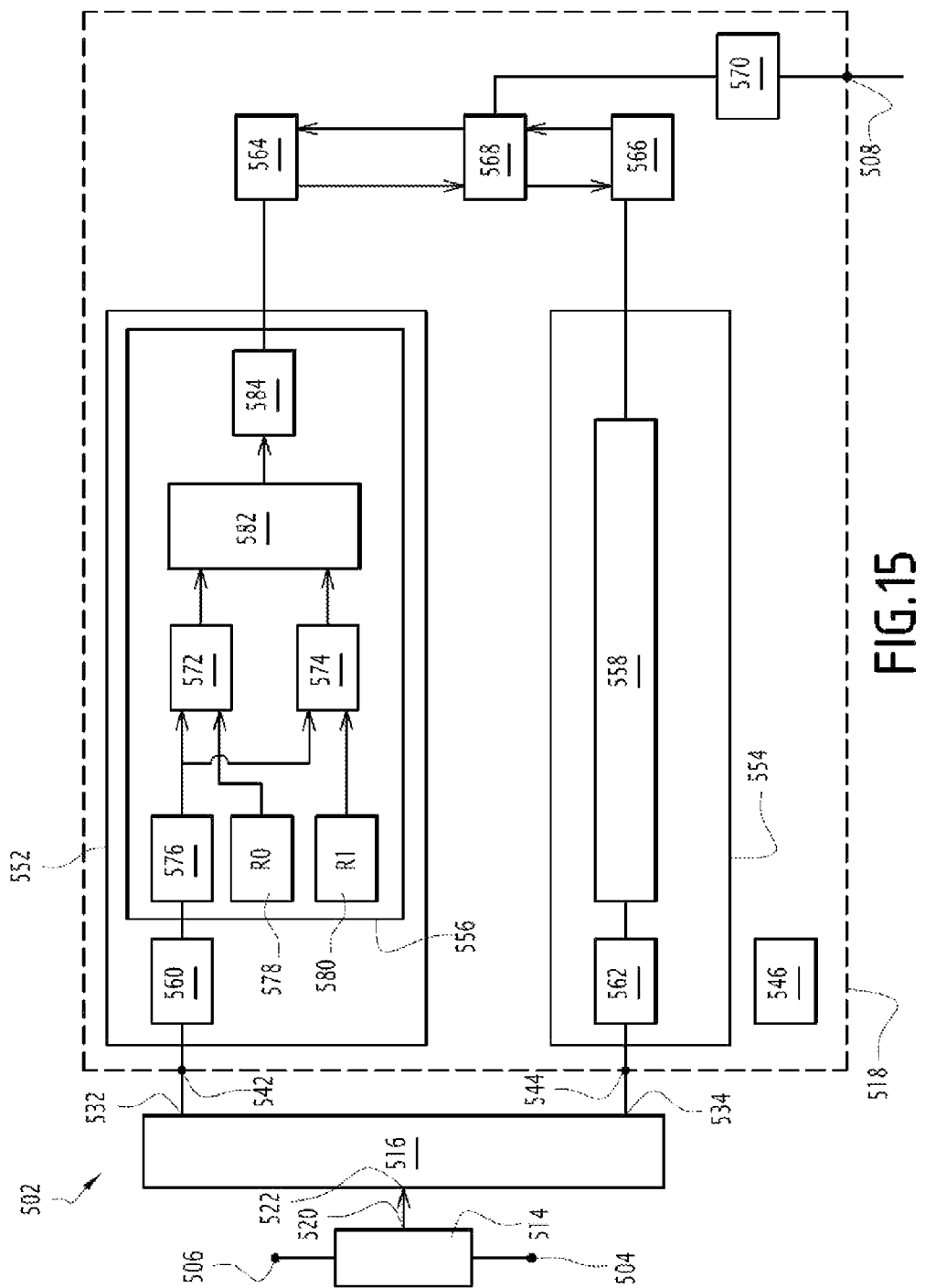
FIG. 15 is a view of the architecture of the communication receiver of the communication system of FIG. 1 according to a first embodiment corresponding to the first embodiment of the encoding protocol of FIGS. 4 and 5.

According to FIG. 15 and a first embodiment, a receiver 502 suitable for receiving communication signals having been processed according to the first encoding embodiment described in FIG. 4 comprises a first upstream terminal 504, connected through the DC current bus 12 to the communication transmitter situated further downstream, a second downstream terminal 506 connected to the power inverter through the bus with carrier current, a third output terminal 508 for providing, with a high degree of reliability, remote measurement data accompanied by the physical address of the communication transmitter with which they are associated.

The communication receiver 502 includes an analog head 514, an analog/digital converter 516, and a digital computer 518.

The analog head 514 is configured to withdraw, amplify and filter a received communication signal as being the sum of the communication signals transmitted by the communication transmitters and conveyed on the carrier current bus.

The analog head 514 whereof the elements are not shown in FIG. 15 includes a current/voltage converter followed by a high-pass active filter to uncouple the received communication signal whose low frequency components have a low level and do not convey information, and provide the amplified and filtered received communication signal at an output terminal 520. The current/voltage converter 516 for example includes a shunt resistor of 1 mohm of voltage withdrawal, connected between the first upstream terminal 504 and the second downstream terminal 506, and an operational amplifier with its input shunted by the withdrawal resistor.

The analog/digital converter 516 is configured to sample the signal received from the analog head 514, the direct component of which has been eliminated, into received signal samples at sampling moments repeated at least at twice the transmission frequency of the chips, the sampling moments following one another by a fourth predetermined number Nphi greater than or equal to two phases repeated cyclically according to the period equal to the duration of the chip and each identified by a phase rank comprised between 1 and Nphi.

The analog/digital converter 516 includes an input terminal 522 connected to the output terminal 520 of the analog head 514, and here comprises, as an example, two first and second digital output terminals 532, 534 each corresponding to a different phase rank $\phi(1)$, $\phi(2)$.

The digital computer 518 here is a microprocessor or microcontroller with a traditional architecture, which can be qualified over a wide temperature range.

Alternatively, the digital computer incorporates the analog/digital converter.

The computer 518 includes a first terminal and a second input terminal 542, 544, respectively connected to the first and second digital output terminals 532, 534 of the analog/digital converter 516, and the output terminal 508 of the communication receiver, and an internal clock 546.

The digital computer 508 is configured to implement digital processing to transform sampled digital data provided at the input terminals 542, 544 into reliable digital data regarding the photovoltaic modules.

The digital processing is implemented in the form of software modules executed sequentially.

A first module 552 and a second module 554 are respectively associated with the first phase rank $\phi(1)$ and the second phase rank $\phi(2)$.

The first and second modules 552, 554 are respectively configured for each phase, after each sampling moment and from a number of previous first samples and with the same phase rank as that of the sampling moment, equal to the product of the spreading factor SF times the total number of binary data Nt of a frame divided by the length Ns of a symbol, determining an associated third raw reception frame, the first at the first phase rank $\phi(1)$ and the second at the second phase rank $\phi(2)$, using a sliding frame window correlation unit 556, 558 and the set of basic elementary encoding sequences.

It should be noted that for implementing the determination of the third frame strictly speaking, digital filtering to reject the order 2 harmonic of the power converter is implemented within the first and second modules 552, 554 by an associated rejection unit 560, 562.

A third module 564 and a fourth module 566 are respectively associated with the first module 552 and the second module 554.

The third and fourth modules 564, 566 are configured to verify, from their third respective frame, whether the error detection code has detected the erroneous third frame, and when no error is detected by the error detection code, to extract the transmitted address and compare it to a predetermined list of transmitters 568.

The predetermined list of transmitters 568 is a provided list determined at the receiver during its installation or as a list of transmitters built from statistical filtering implemented on the transmitter addresses extracted from the third frames for which no error is detected by the error detection code.

When the extracted address appears in the list 568, the remote measurement data of the payload and the physical address of the associated communication transmitter are delivered at the output by a delivery unit 570.

According to FIG. 15, only the architecture of the sliding frame window correlation unit 556 associated with the first module 552 is shown, in which only samples with rank $\phi(2)$ are processed.

The architecture, not shown FIG. 15, of the sliding frame window correlation unit 558 associated with the second module 554 is identical to that of the correlation unit 556 of the first module 552 and differs therefrom only in that only the samples with the second rank $\phi(1)$ are processed.

The first sliding frame window correlation unit 556 is configured to compute, in parallel, the possible correlation products over a set of transformed correlation replicas and over the set of possible shift configurations of each transformed correlation replica. This parallel computation is done after each sampling moment and from a number of previous first samples with a same first rankwith phase $\phi(1)$ as that of the sampling moment, equal to the spreading factor SF. The transformed correlation replicas are obtained by transforming the levels 0, 1 of half of the basic elementary encoding sequences without a match between one another to levels −1, 1. Here, as has been seen, the encoded symbols S0 and S1 correspond to a first set of basic elementary sequences, the second set of elementary sequences complementary to those of the first set being made up of the sequences associated with the encoded symbol S2 and S3. Here, for example, the transformed correlation replicas are obtained by transforming levels 0, 1 of the associated elementary transmission encoding sequences S0, S1. The implementation of this parallel computation is done by a first parallel computation unit 572 and a second parallel computation unit 574, respectively associated with the first transformed replica R0 of the encoded symbol C0 and the second transformed replica R1 of the encoded symbol C1. The first and second parallel computation units 572, 574 are powered by a buffer memory 576 with length SF of the samples with rank $\phi(1)$ and by the transformed replicas R0, R1 stored in associated memories 578, 580.

Alternatively, when all of the elementary encoding sequences have no match, i.e., are all basic encoding sequences, the transformed correlation replicas are obtained by respective transformations of the levels 0, 1 of the set of elementary encoding sequences into levels −1, 1.

Through a detection unit 582, the first sliding frame window correlation unit 556 is configured to detect the received symbol as detected symbol from the possible correlation products.

When the cardinal of the set of elementary encoding sequences is twice the cardinal of the set of basic elementary encoding sequences, the detected symbol corresponds to:
- either the elementary encoding sequence associated with the transformed correlation replica of the computed correlation product having the highest positive level when the cardinal of the set of elementary encoding sequences is twice the cardinal,
- or the complementary elementary sequence of the elementary encoding sequence associated with the transformed correlation replica of the computed correlation product having the highest computed negative level.

Alternatively, the detected symbol corresponds to the elementary encoding sequence associated with the transformed correlation replica of the computed correlation product having the highest level when the respective cardinals of the set of elementary encoding sequences and the set of transformed correlation replicas are equal.

Through a symbol/bit decoding/serialization unit 584, the first sliding frame window correlation unit 556 is configured to decode the symbol detected by the detection unit 582 in the sequence of Ns corresponding bits and enter the binary data in a shift register having the length Nt of a third frame as its length.

Figure 16:
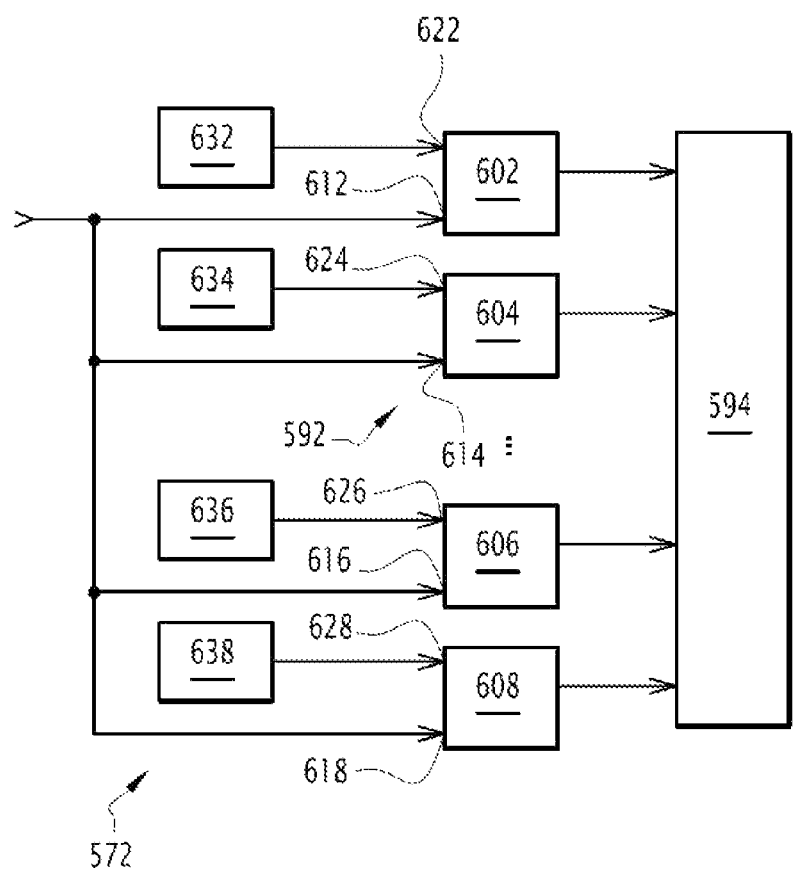
FIG. 16 is a view of the architecture of a unit for the parallel computation of correlation products that is part of the receiver of FIG. 15.

According to FIG. 16 and a detailed architecture, the first parallel computation unit 572 includes a battery 592 of SF elementary correlators and a correlation product selection unit 594.

Here in FIG. 16, only four of the elementary correlators among the sixteen, respectively denoted 602, 604, 606, 608, are shown, corresponding to different shift ranks of the transformed elementary replica R0 associated with the encoding sequence C0, here 0.1, 14 and 15.

The sixteen elementary correlators 602, 604, 606, 608 are positioned in parallel and each powered at a different first input 612, 614, 616, 618, connected to the output of the buffer memory, and by a second different input 622, 624, 626, 628 of the associated transformed elementary replica R0 with rank 0 and cyclically shifted by a different shift rank chosen from the series of integers from 0 to 15.

Each elementary correlator 602, 604, 606, 608 is configured to compute a correlation product as the correlation product of a same sliding window for received samples with a same first rank $\phi(1)$, the window here containing 16 successive samples of a first rank with a unique and different configuration 632, 634, 636, 638 from the associated transformed elementary replica R0, with rank 0 and cyclically shifted by a different shift rank.

The selection unit 594 for the correlation unit is configured to select, without sign change, from among the 16 correlation products, computed in parallel and provided by the elementary correlators 602, 604, 606, 608, the correlation product having the largest absolute value.

Figure 17:
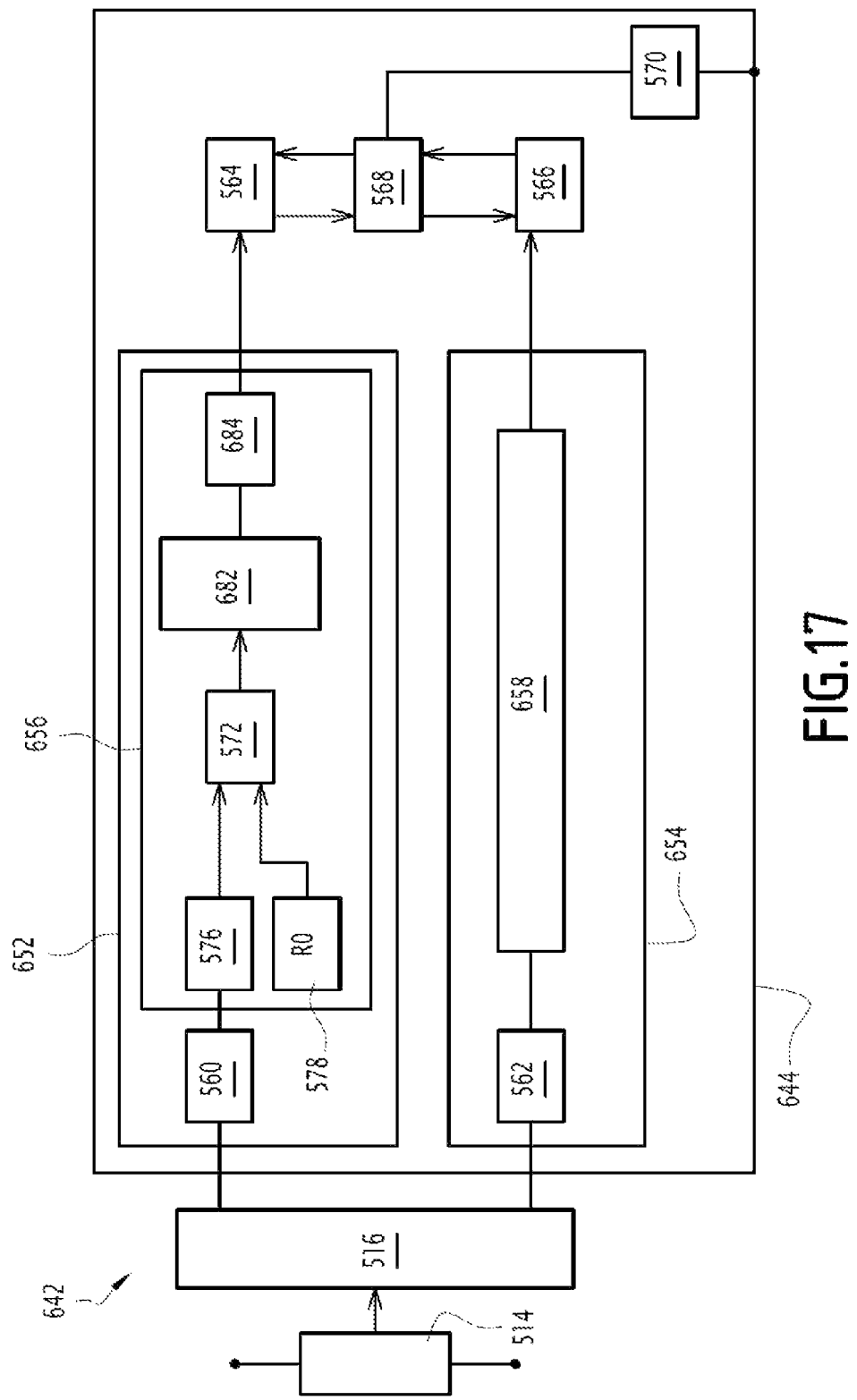
FIG. 17 is a view of the architecture of the communication receiver of the communication system of FIG. 1 according to a second embodiment, corresponding to the second embodiment of the encoding protocol of FIGS. 8 and 9.

According to FIG. 17 and a second embodiment of the receiver 642, suitable for the second embodiment of the encoding protocol, the receiver 642, like the receiver of FIG. 15, comprises the same analog head 514 and the same analog/digital converter 516.

Like the receiver of FIG. 15, the receiver is configured to process a sampled received signal in two phases $\phi(1)$, $\phi(2)$ and a spreading factor signal equal to 16.

Unlike the receiver of FIG. 15, the detected symbols are not two-bit words. Here, the notions of bits and symbols are combined.

Here, the receiver 642 includes a computer 644 with the same hardware architecture and the same interface diagram as the computer of the receiver of FIG. 15.

The digital computer 644 differs from the computer by its software configuration.

The digital processing done by the computer in the form of software modules executed sequentially includes a first module 652 and a second module 654, respectively associated with the first rank with phase $\phi(1)$ and the second rank with phase $\phi(2)$, and the same third and fourth modules 564, 566 as those described in FIG. 15.

The first and second modules 652, 654 are respectively configured for each phase, after each sampling moment and from a number of previous first samples, and with the same phase rank as those of the sampling moment, here equal to the product of the spreading factor SF times the total number of binary data Nt of a frame, to respectively determine a third raw receiving frame and a fourth raw receiving frame that are associated with the first phase rank $\phi(1)$ and the second phase rank $\phi(2)$, using an associated sliding frame window correlation unit 656, 658 and the set of basic elementary encoding sequences.

It should be noted that before implementing the determination of the third frame and the fourth frame strictly speaking, a same digital filtering for rejecting the order 2 harmonic of the power converter as that described in FIG. 15 is implemented within the first and second modules by the same associated rejection units 560, 562.

According to FIG. 17, only the architecture of the sliding frame window correlation unit 656 associated with the first module 652, in which only the samples with rank $\phi(1)$ are processed, is shown in detail.

The architecture, not shown in FIG. 17, of the sliding frame window correlation unit 658 associated with the second module 654 is identical to that of the correlation unit 656 of the first module and differs therefrom only in that only the samples of the second rank $\phi(2)$ are processed.

The first sliding frame window correlation unit 656 is configured to compute, in parallel, the possible correlation products over a set of transformed correlation replicas and over the set of possible shift configurations of each transformed correlation replica. This parallel computation is done after each sampling moment and from a number of previous first samples, and with the same first phase rank $\phi(1)$ as that of the sampling moment, equal to the spreading factor SF. The transformed correlation replicas are obtained by transforming the levels 0, 1 of half of the elementary transmission sequences with no match between them into levels −1, 1. Here, as seen in FIG. 7, the encoded symbol or encoded bit SB0 corresponds to a first singleton set of a basic elementary encoding sequence, the second singleton set of the elementary encoding sequence complementary to that of the first set here being made up of the sequence associated with the encoded symbol SB1, i.e., the encoded bit 1. Here, for example, a single transformed correlation replica R0 is obtained by transforming the levels 0, 1 of the basic elementary encoding sequence C0 associated with the symbol SB0.

The implementation of this parallel computation here is done by a single parallel computation unit identical to the first parallel computation unit 572 associated with the first transformed replica of the encoded bit S0 supplied by the same buffer memory 576 with length SF of the samples with rank $\phi(1)$ and the transformed replicas stored in the memory 578.

Through a detection unit 682, the first sliding frame window correlation unit 656 is configured to detect the received bit as the bit detected from possible correlation products.

When the cardinal of the set of elementary encoding sequences is twice the cardinal of the set of elementary replicas, which is the case here, the detected bit corresponds to:
  either the elementary encoding sequence associated with the transformed correlation replica for which the computed correlation product has the highest level in absolute value and has a positive sign,
  or the complementary elementary encoding sequence of the elementary encoding sequence associated with the transformed correlation replica for which the computed correlation product has the highest level in absolute value and has a negative sign.

Alternatively, the detected bit corresponds to the elementary encoding sequence associated with the transformed correlation replica of the computed correlation product having the highest level in the respective cardinals when the set of elementary encoding sequences and the set of transformed correlation replicas are equal.

Through a bit serializing unit 684, the first sliding frame window correlation unit 656 is configured to enter the binary data in the form of detected bits in a shift register having the length Nt of a third frame for its length.

Alternatively, the digital computers described in FIGS. 4, 15, 17 and their software modules can be made in the form of cabled electronic logic circuits having a more or less high integration level, for example a dedicated ASIC circuit, one or more FPGA circuits.

Figure 18:
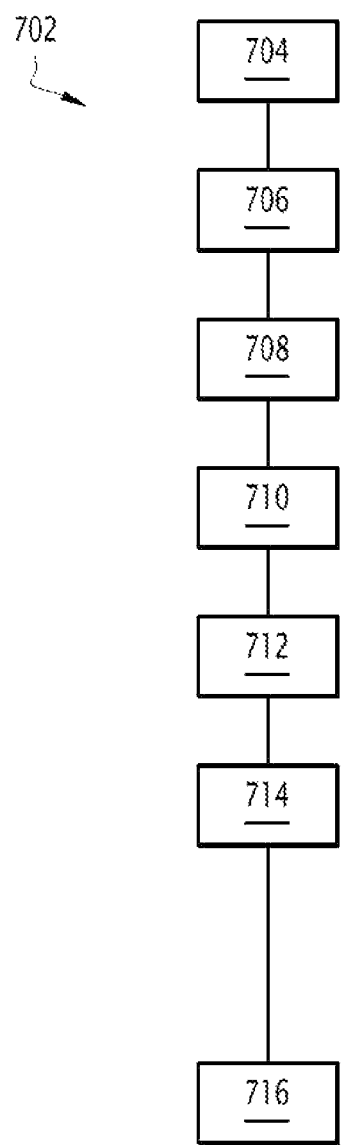
FIG. 18 is a flowchart of a method for implementing the communication system of FIG. 1.

According to FIG. 18, a method for low data-rate communication 702 by modulated direct carrier current implements the communication system described above.

The communication method 702 is designed to convey payload messages, transmitted asynchronously and at an average frequency from one or a plurality of at least two communication transmitters toward a same receiver through a wire bus with DC carrier current power connecting the transmitters and the receiver together and in series.

The communication method includes a set of steps 704, 706, 708, 710, 712, 714, 716, 718.

In the first step 704, each transmitter forms a first raw transmission frame in the form of the first sequence of a first constant number NT of binary raw data, encoded over two states chosen from among 0 and 1, the sequence of binary raw data forming the first frame being subdivided into a unique and different address characterizing the transmitter, a payload, and an error detection code for the first frame determined from the payload and the address of the transmitter.

In the second step 706, each transmitter spreads in frequency, by a predetermined spreading factor SF, the first raw transmission frame in a second spread transmission frame in terms of transmission spectrum, the second spread transmission frame assuming the form of a second sequence of chips and being obtained, by first encoding the binary raw data of the first raw transmission frame into symbols with a length of a second predetermined number Ns according to a bijective correspondence rule between the set of all possible sequences of binary raw data with length the second number Ns and a set of two to the power Ns symbols, then next by encoding each obtained symbol in a distinct spreading elementary encoding sequence formed by binary chips, encoded over two states chosen from among 0 and 1, the distinct elementary encoding transmission sequence depending on the symbol and having for length, a third predetermined integer number of chips defined as the spreading factor SF.

In the third step 708, each transmitter modulates and transmits, over the wire bus, the chips of the second spread frame in a transmitter signal according to a predetermined modulation, for example OOK modulation. Each elementary encoding sequence is chosen from among the possible chip sequences, with spreading factor SF for length, so as to meet the following requirements:
- each elementary sequence forms a balanced code having a central autocorrelation peak having a first level and secondary autocorrelation peaks having second levels significantly lower than the first level in a ratio less than or equal to 0.3,
- at least half of the elementary encoding sequences of the cross-correlation levels with respect to one another significantly lower than the first autocorrelation level,
- the elementary encoding sequences for transmission and spreading of the symbols used by all of the transmitters are independent of the transmitter.

The transmission moments of the first raw frames developed by each transmitter are autonomously and freely determined by each transmitter without taking into account any synchronization signal external to the transmitter.

In the fourth step 710, the communication receiver captures, amplifies and filters a received communication signal as being the sum of the communication signals emitted by the communication transmitters and conveyed to an input of the receiver.

In the fifth step 712, the communication receiver samples the received signal, the direct component of which has been eliminated, in received signal samples according to sampling moments repeated at a frequency greater than the transmission frequency of the chips, the sampling moments following one another according to a fourth predetermined integer number Nphi, greater than or equal to two, of phases repeated cyclically according to a period equal to the duration of a chip and each identified by a phase rank comprised between 1 and Nphi.

In a sixth step 714, after each sampling moment and from the fifth number of previous first samples with the same phase rank as that of the sampling moment, equal to the product of the spreading factor SF times the total number of binary data Nt of a frame divided by the length Ns of a symbol, the communication receiver determines a third raw receiving frame from a sliding frame window correlation unit and the set of elementary sequences.

Then, in the seventh step 716, after each sampling moment associated with the same phase rank, when the third raw frames associated with the Nphi minus one of the immediately preceding sampling moments and the sampling moment associated with the same phase rank, the communication receiver verifies whether the error detection code of the determined third frame detects the erroneous third frame, and when no error is detected by the error detection code, the receiver extracts the transmitter address and compares it to a predetermined list of transmitters.

It is possible to use the robustness of the transmission through the example of the system using a 32-bit address, a 16-bit payload, a 16-bit CRC, with Ns equal to 4 and SF equal to 16. It can be shown that the likelihood of having a valid CRC of sixteen bits in a random frame is $2^{-16}$. Since a preframe is decoded every 0.5 ms, a candidate frame with a valid CRC is produced every thirty-three seconds on average. Furthermore, since there are $2^{32}$ possible physical addresses and no more than twenty-four of them are used in a photovoltaic chain, the likelihood of a false detection of an actual address is twenty-four times $2^{-32}$, i.e., $5.5\ 10^{-9}$. Thus, this event will occur on average once every four hundred years, assuming twelve hours of operation per day.

Alternatively, the communication system described above includes a single communication transmitter.

The field of application of the communication system is not limited to photovoltaic applications, and may be extended to other applications in which a communication bus with carrier current is available.

The invention claimed is:

1. A system for low data-rate communication over a modulated direct carrier current, designed to convey payload messages, transmitted asynchronously and at an average frequency from one or a plurality of at least two communication transmitters to a same receiver, through a wire bus using direct carrier current connecting the transmitters and the receiver to each other in series, comprising
   one or a plurality of at least two communication transmitters,
   a communication receiver,
   a wire bus with modulated direct carrier current forming a shared transmission channel and connecting the communication transmitters from the plurality and the communication receiver,
   each communication transmitter being configured to form a first raw transmission frame in the form of a first sequence of a first constant number Nt of binary raw data, encoded over two states chosen from among 0 and 1, the binary raw data sequence forming a first frame being subdivided into a unique and different physical address characterizing the transmitter, a payload, and an error detecting code on the first frame determined from the payload and the physical address of the communication transmitter,
   wherein
   each communication transmitter is configured to
   spread in frequency, by a predetermined spreading factor SF, the first raw transmission frame in a second spread transmission frame in terms of transmission spectrum, the second spread transmission frame assuming the form of a second sequence of chips and being obtained, by first successively encoding the binary raw data of the first raw transmission frame into symbols with a length of a second predetermined number Ns according to a bijective correspondence rule between the set of all possible sequences of binary raw data with length the second number Ns and a set of two to the power Ns symbols, then next by encoding each obtained symbol in a distinct spreading elementary encoding sequence formed by binary chips, encoded over two states chosen from among 0 and 1, the distinct elementary encoding sequence for spreading depending on the symbol and having for length, a third predetermined integer number of chips defined as the spreading factor SF, and modulating and transmitting, over the wire bus, the chips of the second spread frame in a transmitted communication signal according to a predetermined modulation, in that each elementary spreading sequence is chosen from among the possible chip sequences, with spreading factor SF as length, so as to form a balanced code having a central autocorrelation peak having a first level that is clearly higher than that second levels of the correlation products having correlation shifts, the duration of which is greater than or equal to a chip period, in that the elementary encoding sequences for spreading the symbols used by all of the transmitters are identical, and in that the times of the initial transmission of the second spread frames developed by each transmitter are autonomously and freely determined by each transmitter, without taking a synchronization signal outside the transmitter into account.

2. The system for low data-rate communication over a carrier current according to claim 1, wherein each transmitter comprises a unique and different associated module for creating times of the initial transmission of the second spread frames, randomly or pseudo-randomly distributed and separated by a rational number of chip periods greater than or equal to zero, to create time intervals with variable lengths separating the second spread frames coming from different transmitters and desynchronize said received second spread frames.

3. The system for low data-rate communication over a carrier current according to claim 1, wherein the number of symbols, equal to the number of elementary sequences, is comprised in the set of integers 2, 4, 8, and the spreading factor is greater than or equal to 4, preferably equal to 16.

4. The system for low data-rate communication over a carrier current according to claim 1, wherein the set of elementary encoding sequences consists of a first set of basic elementary encoding sequences and a second set of elementary encoding sequences each having the same cardinal, each of the elementary encoding sequences of the second set being the complementary encoding sequence of a basic elementary encoding sequence corresponding to the first set.

5. The system for low data-rate communication over a carrier current according to claim 1, wherein the modulation of the chips implemented by the communication transmitters is a modulation of the off/on keying type according to which the 0 state of a chip corresponds to a first voltage level on the bus, and the 1 state of the chip corresponds to a second voltage level different from the first on the bus.

6. The system for low data-rate communication over a carrier current according to claim 1, wherein each communication transmitter comprises a pulse generator to implement the modulation of the chips on the bus, and the pulse generator is chosen to be a current controlled generator, a voltage controlled generator or an impedance controlled modulator.

7. The system for low data-rate communication over a carrier current according to claim 1, wherein the receiver is configured to filter and amplify a received communication signal as being the sum of the communication signals emitted by the communication transmitters and conveyed to an input of the communication receiver, and sampling the received signal, the direct component of which has been eliminated, in received signal samples according to sampling moments repeated at least at a frequency equal to twice the transmission frequency of the chips, the sampling moments following one another according to a fourth predetermined number Nphi, greater than or equal to two, of phases repeated cyclically according to a period equal to the duration of the chip and each identified by a phase rank comprised between 1 and Nphi, after each sampling moment and from a previous number of first samples with the same phase rank as that of the sampling moment, equal to the product of the spreading spectrum SF times the total number of binary data Nt of a frame divided by the length Ns of a symbol, determining a third raw reception frame using a sliding frame window correlation unit and the set of elementary sequences, then from the third frame, verifying whether the error detection code of the third determined frame detects the third erroneous frame, and when no error is detected by the error detection code, extracting the transmitter's address and comparing it to a predetermined list of transmitters.

8. The communication system according to claim 7, the sliding frame window correlation unit of the receiver is configured to after each sampling moment and from a number of previous first samples, with the same phase rank as that of the sampling moment, equal to the spreading factor SF, compute, in parallel over a set of transformed correlation replicas and over the set of possible shift configurations for each transform correlation replica, the possible correlation products, the transformed correlation replicas either being obtained by respective transformation of levels 0, 1 of the set of spreading encoding sequences into levels −1, 1, or obtained by transforming the levels 0, 1 of half of the basic elementary transmission encoding sequences with no match between them into levels −1, 1 when the elementary transmission sequences consist of a first set of basic elementary encoding sequences and a second set of elementary encoding sequences complementary to the basic ones of the first set, and detecting the received symbol as being the symbol corresponding to either the elementary encoding sequence associated with the transformed correlation replica of the computed correlation product having the highest level when the respective cardinals of the set of encoding elementary sequences and the set of transformed correlation replicas are equal, or the elementary encoding sequence associated with the transformed correlation replica of the computed correlation product having the highest positive level when the cardinal of the set of elementary encoding sequences is twice the cardinal of the set of transformed correlation replicas, or the complementary elementary encoding sequence of the basic elementary encoding sequence associated with the transformed correlation replica of the correlation product having the highest negative level calculated when the cardinal of the set of elementary encoding sequences is twice the cardinal of the set of transformed correlation replicas, then decoding the symbol in the sequence of Ns corresponding bits and entering the binary data in a shift register having the length Nt of a third frame as its length.

9. The communication system according to claim 7, wherein the list of predetermined transmitters is a list provided and determined at the receiver when it is installed or is a list of transmitters built from statistical filtering implemented on the transmitter addresses extracted from the third frames for which no error is detected by the error detection code.

10. A method for low data-rate communication over a modulated direct carrier current implemented by a communication system according to claim 1, designed to convey payload messages, transmitted asynchronously and at an average frequency from one or a plurality of at least two communication transmitters to a same communication receiver through a wire bus using direct carrier current connecting the communication transmitters and the communication receiver to each other in series, the step consisting of the following:

each communication transmitter forms a first raw transmission frame in the form of a first sequence of a first constant number Nt of binary raw data, encoded over two states chosen from among 0 and 1, the binary raw data sequence forming a first frame being subdivided into a unique and different address characterizing the transmitter, a payload, and an error detecting code on the first frame determined from the payload and the address of the transmitter, the method further comprising the following steps:

each transmitter spreads in frequency, by a predetermined spreading factor SF, the first raw transmission frame in a second spread transmission frame in terms of transmission spectrum, the second spread transmission frame assuming the form of a second sequence of chips and being obtained, by first successively encoding the binary raw data of the first raw transmission frame into symbols with a length of a second predetermined number Ns according to a bijective correspondence rule between the set of all possible sequences of binary raw data with length the second number Ns and a set of two to the power Ns symbols, then by including each obtained symbol in a distinct spreading elementary encoding sequence formed by binary chips, encoded over two states chosen from among 0 and 1, the distinct elementary encoding sequence for spreading depending on the symbol and having for length, a third predetermined integer number of chips defined as the spreading factor SF, then each transmitter modulates and transmits, over the wire bus, the chips of the second spread frame in a transmitter signal according to a predetermined modulation, each elementary transmission sequence being chosen from among the possible chip sequences, with spreading factor SF length, so as to form a balanced code having a central autocorrelation peak having a first level that is clearly higher than that second levels of the correlation products having correlation shifts, the duration of which is greater than or equal to a chip period, and the elementary encoding sequences for spreading the symbols used by all of the communication transmitters being independent of the communication transmitter, and the times of the initial transmission of the second spread frames developed by each communication transmitter being autonomously and freely determined by each communication transmitter, without taking a synchronization signal outside the communication transmitter into account.

11. The method for low data-rate communication over a carrier current according to claim 10, wherein the communication receiver filters and amplifies a received communication signal as being the sum of the communication signals emitted by the transmitters and conveyed to an input of the receiver, and the communication receiver samples the received communication signal, the direct component of which has been eliminated, in received signal samples according to sampling moments repeated at least at a frequency equal to twice the transmission frequency of the chips, the sampling moments following one another according to a fourth predetermined number Nphi, greater than or equal to two, of phases repeated cyclically according to a period equal to the duration of the chip and each identified by a phase rank comprised between 1 and Nphi, and after each sampling moment and from a previous number of first samples with the same phase rank as that of the sampling moment, equal to the product of the spreading spectrum SF times the total number of binary data Nt of a frame divided by the length Ns of a symbol, the receiver determines a third raw reception frame using a sliding frame window correlation unit and the set of elementary sequences, then from the third frame, the receiver verifies whether the error detection code of the third determined frame detects the third erroneous frame, and when no error is detected by the error detection code, the receiver extracts the transmitter's address and compares it to a predetermined list of transmitters.

12. A communication transmitter designed to be integrated into a system defined according to claim 1, comprising a first module for forming a first raw transmission frame in the form of a first sequence of a first constant number Nt of binary raw data, encoded over two states chosen from among 0 and 1, the binary raw data sequence forming a first frame being subdivided into a unique and different address characterizing the transmitter, a payload, and an error detecting code on the first frame determined from the payload and the address of the transmitter, comprising a second module configured to spread in frequency, by a predetermined spreading factor SF, the first raw transmission frame in a second spread transmission frame in terms of transmission spectrum, the second spread transmission frame assuming the form of a second sequence of chips and being obtained, by first successively encoding the binary raw data of the first raw transmission frame into symbols with a length of a second predetermined number Ns according to a bijective correspondence rule between the set of all possible sequences of binary raw data with length the second number Ns and a set of two to the power Ns symbols, then by including each obtained symbol in a distinct spreading elementary encoding sequence formed by binary chips, encoded over two states chosen from among 0 and 1, the distinct elementary encoding sequence for spreading depending on the symbol and having for length, a third predetermined integer number of chips defined as the spreading factor SF, and a pulse generator to modulate and transmit, over the wire bus, the chips of the second spread frame in a transmitted communication signal according to a predetermined modulation, each elementary transmission sequence being chosen from among the possible chip sequences, with spreading factor SF length, so as to form a balanced code having a central autocorrelation peak having a first level that is clearly higher than that second levels of the correlation products having correlation shifts, the duration of which is greater than a chip period, and the times of the initial transmission of the two frames developed by the transmitter being autonomously and freely determined by each transmitter, without taking a synchronization signal outside the transmitter into account.

13. A communication receiver designed to be integrated into a system defined according to claim 1, comprising an analog head for filtering and amplifying a received communication signal as being the sum of the communication signals emitted by the communication transmitters and conveyed to an input of the receiver, and a unit for sampling the received signal, the direct component of which has been eliminated by the analog head, in received signal samples according to sampling moments repeated at least at a Nyquist frequency substantially equal to twice the transmission frequency of the chips, the sampling moments following one another according to a fourth predetermined number Nphi, greater than or equal to two, of phases repeated cyclically according to a period equal to the duration of the chip and each identified by a phase rank comprised between 1 and Nphi, a processing unit configured to after each sampling moment and from a previous number of first samples with the same phase rank as that of the sampling moment, equal to the product of the spreading spectrum SF times the total number of binary data N of a frame divided by the length Ns of a symbol, determining a third raw reception frame using a sliding frame window correlation unit and the set of elementary sequences, then from the third frame, verifying whether the error detection code of the third determined frame detects the third erroneous frame, and when no error is detected by the error detection code, extracting the transmitter's address and comparing it to a predetermined list of transmitters.

14. A non-transitory computer-readable product comprising computer executable instructions which, when executed, performs steps of a communication method for low data-rate communication over a modulated direct carrier current implemented by a communication system, designed to convey payload messages, transmitted asynchronously and at an average frequency from one or a plurality of at least two communication transmitters to a same communication receiver through a wire bus using direct carrier current connecting the communication transmitters and the communication receiver to each other in series, the step consisting of the following:

each communication transmitter forms a first raw transmission frame in the form of a first sentence of a first constant number Nt of binary raw data, encoded over two states chosen from among 0 and 1, the binary raw data sequence forming a first frame being subdivided into a unique and different address characterizing the transmitter, a payload, and an error detecting code on the first frame determined from the payload and the address of the transmitter, each transmitter spreads in frequency, by a predetermined spreading factor SF, the first raw transmission frame in a second spread transmission frame in terms of transmission spectrum, the second spread transmission frame assuming the form of a second sequence of chips and being obtained, by first successively encoding the binary raw data of the first raw transmission frame into symbols with a length of a second predetermined number Ns according to a bijective correspondence rule between the set of all possible sequences of binary raw data with length the second number Ns and a set of two to the power Ns symbols, then by including each obtained symbol in a distinct spreading elementary encoding sequence formed by binary chips, encoded over two states chosen from among 0 and 1, the distinct elementary encoding sequence for spreading depending on the symbol and having for length, a third predetermined integer number of chips defined as the spreading factor SF, then each transmitter modulates and transmits, over the wire bus, the chips of the second spread frame in a transmitter signal according to a predetermined modulation, each elementary transmission sequence being chosen from among the possible chip sequences, with spreading factor SF length, so as to form a balanced code having a central autocorrelation peak having a first level that is clearly higher than that second levels of the correlation products having correlation shifts, the duration of which is greater than or equal to a chip period, and the elementary encoding sequences for spreading the symbols used by all of the communication transmitters being independent of the communication transmitter, and the times of the initial transmission of the second spread frames developed by each communication transmitter being autonomously and freely determined by each communication transmitter, without taking a synchronization signal outside the communication transmitter into account when said program operates on one or more digital computers of the communication system.

* * * * *